United States Patent
Beijbom et al.

(10) Patent No.: US 11,500,063 B2
(45) Date of Patent: Nov. 15, 2022

(54) DEEP LEARNING FOR OBJECT DETECTION USING PILLARS

(71) Applicant: Motional AD LLC, Boston, MA (US)

(72) Inventors: Oscar Olof Beijbom, Santa Monica, CA (US); Alex Hunter Lang, Culver City, CA (US)

(73) Assignee: Motional AD LLC, Boston, MA (US)

( * ) Notice: Subject to any disclaimer, the term of this patent is extended or adjusted under 35 U.S.C. 154(b) by 450 days.

(21) Appl. No.: 16/679,099

(22) Filed: Nov. 8, 2019

(65) Prior Publication Data

US 2020/0150235 A1    May 14, 2020

Related U.S. Application Data

(60) Provisional application No. 62/757,613, filed on Nov. 8, 2018.

(51) Int. Cl.
*G01S 7/48* (2006.01)
*G06N 3/08* (2006.01)
(Continued)

(52) U.S. Cl.
CPC .......... *G01S 7/4808* (2013.01); *G01S 7/4802* (2013.01); *G01S 17/42* (2013.01); *G01S 17/89* (2013.01);
(Continued)

(58) Field of Classification Search
CPC ...... G01S 7/4808; G01S 7/4802; G01S 17/42; G01S 17/89; G01S 17/931; G01S 7/417;
(Continued)

(56) References Cited

U.S. PATENT DOCUMENTS 8,825,391 B1    9/2014  Urmson et al.
8,885,151 B1    11/2014 Chatham et al.
(Continued)

FOREIGN PATENT DOCUMENTS

CN    108171217      6/2018
CN    108475058 A    8/2018
(Continued)

OTHER PUBLICATIONS

DK 3rd Technical Examination in Danish Appln. No. PA 201970115, dated Jul. 17, 2020, 5 pages.
(Continued)

*Primary Examiner* — Russell Frejd
*Assistant Examiner* — Ellis B. Ramirez
(74) *Attorney, Agent, or Firm* — Fish & Richardson P.C.

(57) ABSTRACT

Among other things, we describe techniques for detecting objects in the environment surrounding a vehicle. A computer system is configured to receive a set of measurements from a sensor of a vehicle. The set of measurements includes a plurality of data points that represent a plurality of objects in a 3D space surrounding the vehicle. The system divides the 3D space into a plurality of pillars. The system then assigns each data point of the plurality of data points to a pillar in the plurality of pillars. The system generates a pseudo-image based on the plurality of pillars. The pseudo-image includes, for each pillar of the plurality of pillars, a corresponding feature representation of data points assigned to the pillar. The system detects the plurality of objects based on an analysis of the pseudo-image. The system then operates the vehicle based upon the detecting of the objects.

16 Claims, 17 Drawing Sheets

(51) Int. Cl.
| | |
|---|---|
| *G06N 3/04* | (2006.01) |
| *G01S 17/89* | (2020.01) |
| *G05D 1/00* | (2006.01) |
| *G01S 17/42* | (2006.01) |
| *G01S 17/931* | (2020.01) |
| *G05D 1/02* | (2020.01) |

(52) U.S. Cl.
CPC .......... *G01S 17/931* (2020.01); *G05D 1/0088* (2013.01); *G06N 3/04* (2013.01); *G06N 3/08* (2013.01); *G05D 1/0276* (2013.01)

(58) Field of Classification Search
CPC ..... G01S 2013/9316; G01S 2013/9318; G01S 2013/93185; G01S 2013/9319; G01S 2013/9322; G01S 13/865; G01S 13/867; G01S 13/931; G01S 17/894; G01S 17/93; G01S 13/93; G01S 17/06; G05D 1/0088; G05D 1/0276; G06N 3/04; G06N 3/08; G06N 3/0454; G06N 20/00; G01C 21/3804; G06V 10/454; G06V 10/82; G06V 20/56; G06V 2201/12; G06K 9/6274; G06T 17/00; G08G 1/16
USPC .................................... 701/28; 704/232, 259
See application file for complete search history.

(56) References Cited

U.S. PATENT DOCUMENTS

| | | | | |
|---|---|---|---|---|
| 10,970,518 | B1* | 4/2021 | Zhou | G06K 9/6232 |
| 11,100,669 | B1* | 8/2021 | Zhou | G06V 20/64 |
| 11,214,281 | B2 | 1/2022 | Vora et al. | |
| 2002/0107637 | A1 | 8/2002 | Okamura et al. | |
| 2017/0247036 | A1 | 8/2017 | Halder et al. | |
| 2018/0203124 | A1* | 7/2018 | Izzat | G01S 13/865 |
| 2019/0096086 | A1 | 3/2019 | Xu et al. | |
| 2019/0279368 | A1 | 9/2019 | Feng et al. | |
| 2019/0291723 | A1 | 9/2019 | Srivatsa et al. | |
| 2019/0332118 | A1* | 10/2019 | Wang | G06T 7/194 |
| 2020/0293751 | A1 | 9/2020 | Zeng et al. | |
| 2020/0309957 | A1 | 10/2020 | Bjaskaran et al. | |
| 2021/0073345 | A1* | 3/2021 | St. Romain, II | G06F 30/27 |
| 2021/0096241 | A1 | 4/2021 | Karrman et al. | |
| 2021/0146952 | A1 | 5/2021 | Vora et al. | |
| 2022/0080999 | A1 | 3/2022 | Vora et al. | |

FOREIGN PATENT DOCUMENTS

| | | |
|---|---|---|
| CN | 109597087 A | 4/2019 |
| CN | 111145174 | 5/2020 |
| EP | 3349041 | 7/2018 |
| WO | WO 2018170472 | 9/2018 |

OTHER PUBLICATIONS

Everingham et al., "The pascal visual object classes (VOC) challenge," International Journal of Computer Vision, Sep. 9, 2009, 34 pages.
"Ioffe et al., " "Batch normalization: Accelerating deep network training by reducing internal covariate shift," CORR, Feb. 11, 2015, 11 pages.
Meyer et al., "Lasernet: An efficient probabilistic 3d object detector for autonomous driving," In Proceedings of the IEEE Conference on Computer Vision and Pattern Recognition, Mar. 20, 2019 pp. 12677-12687.
Nair et al., "Rectified linear units improve restricted Boltzmann machines," InICML, Jan. 1, 2010, 8 pages.
Wang et al., "Pseudo-lidar from visual depth estimation: Bridging the gap in 3d object detection for autonomous driving," In The IEEE Conference on Computer Vision and Pattern Recognition, Jun. 2019, 16 pages.
Yan et al., SECOND: Sparsely embedded convolutional detection. Sensors, Aug. 20, 2018, 18; 1-17.
Yang et al., "Std: Sparse—todense 3d object detector for point cloud," In Proceedings of the IEEE International Conference on Computer Vision, Jul. 22, 2019, pp. 1951-1960.
Sahba et al., "3D Object Detection Based on LiDAR Data," 2019 IEEE 10th Annual Ubiquitous Computing, Electronics & Mobile Communication Conference (UEMCON), New York City, NY, USA, Oct. 10-12, 2019, pp. 0511-0514.
U.S. Appl. No. 17/096,916, filed Nov. 12, 2020, Vora et al.
Ikhwantri et al., "Learning semantic segmentation score in weakly supervised convolutional neural network," International Conference on Computers, Communications, and Systems (ICCCS), Nov. 2-3, 2015, 19-25.
[No Author Listed], "Surface Vehicle Recommended Practice: Taxonomy and Definitions for Terms Related to Driving Automation Systems for On-Road Motor Vehicles," SAE International, Sep. 30, 2016, 30 pages.
Chen et al., "Multi-View 3D Object Detection Network for Autonomous Driving," IEEE Conference on Computer Vision and Pattern Recognition, Jun. 22, 2017, 9 pages.
DK 1rst Technical Examination in Danish Appln. No. PA 201970115, dated May 13, 2019, 10 pages.
DK 2nd Technical Examination in Danish Appln. No. PA 201970115, dated Dec. 11, 2019, 5 pages.
Geiger et al., "Are we ready for Autonomous Driving? The KITTI Vision Benchmark Suite," IEEE Conference on Computer Vision and Pattern Recognition, Jun. 16, 2012, pp. 1-8.
Ku et al., "Joint 3D Proposal Generation and Object Detection from View Aggregation," Computer Vision and Pattern Recognition, Jul. 12, 2018, 8 pages.
Liu et al., "SSD: Single Shot MutliBox Detector," European Conference on computer vision, Oct. 8, 2016, pp. 1-17.
Qi et al., "PointNett++: Deep Hierarchical Feature Learning on Point Sets in a Metric Space," IEEE Conference on Computer Vision and Pattern Recognition, Jun. 7, 2017, 14 pages.
Qi et al., "Frustum PointNets for 3D Object Detection from RGB-D Data," IEEE Conference on Computer Vision and Pattern Recognition, Apr. 13, 2018, 15 pages.
Qi et al., "Pointnet: Deep learning on point sets for 3d classification and segmentation," IEEE Proc. Computer Vision and Pattern Recognition, Apr. 10, 2017, pp. 1-19.
Simonyan et al., "Very Deep Convolutional Networks for Large-Scale Image Recognition," ICLR, Apr. 10, 2015, 14 pages.
Yang et al., "PIXOR: Real-time 3D Object Detection from Point Clouds," IEEE conference on Computer Vision and Pattern Recognition, Feb. 17, 2019, 7652-7660.
Zhang et al., "Efficient Convolutions for Real-Time Semantic Segmentation of 3D Point Clouds," IEEE: 2018 International Conference on 3D Vision (3DV), May 5, 2018, pp. 399-408.
Zhou et al., "VoxelNet: End-to-End Learning for Point Cloud Based 3D Object Detection," IEEE Conference on Computer Vision and Pattern Recognition, Nov. 17, 2017, 10 pages.
EP Extended Search Report in European Appln. No. 19207887.1, dated Mar. 25, 2020, 5 pages.
Lang et al., "PointPillars: Fast Encoders for Object Detection From Point Clouds," 2019 IEEE/CVF Conference on Computer Vision and Pattern Recognition (CVPR), IEEE, Jun. 15, 2019, 12689-12697.

* cited by examiner

DEEP LEARNING FOR OBJECT DETECTION USING PILLARS

CROSS-REFERENCE TO RELATED APPLICATION

This application claims priority to U.S. Provisional Patent Application No. 62/757,613, filed Nov. 8, 2018, the entire contents of which is incorporated herein by reference.

FIELD OF THE INVENTION

This description relates to a computer system for detecting one or more objects in the environment surrounding an autonomous vehicle using deep learning techniques.

BACKGROUND

Autonomous vehicles can be used to transport people and/or cargo (e.g., packages, objects, or other items) from one location to another. For example, an autonomous vehicle can navigate to the location of a person, wait for the person to board the autonomous vehicle, and navigate to a specified destination (e.g., a location selected by the person). To navigate in the environment, these autonomous vehicles are equipped with various types of sensors to detect objects in the surroundings.

SUMMARY

The subject matter described in this specification is directed to a computer system and techniques for detecting objects in an environment surrounding an autonomous vehicle. Generally, the computer system is configured to receive input from one or more sensors of the vehicle, detect one or more objects in the environment surrounding the vehicle based on the received input, and operate the vehicle based upon the detection of the objects.

In particular, the computer system receives a set of measurements such as a point cloud from a sensor of a vehicle (for example, LIDAR or RADAR). The set of measurements includes a plurality of data points that represent a plurality of objects in a three-dimensional (3D) space surrounding the vehicle. Each data point of the plurality of data points is a set of 3D spatial coordinates. The system divides the 3D space into a plurality of pillars, in which each pillar of the plurality of pillars extends vertically (in the z-direction) from a respective portion of the 2D ground plane of the 3D space. The system then assigns each data point of the plurality of data points to a pillar in the plurality of pillars. The system generates a pseudo-image based on the plurality of pillars. The pseudo-image includes, for each pillar of the plurality of pillars, a corresponding feature representation of data points assigned to the pillar. The system detects the plurality of objects in the 3D space surrounding the sensor based on an analysis of the pseudo-image. The system then operates the vehicle based upon the detecting of the plurality of objects in the 3D space surrounding the vehicle.

These and other aspects, features, and implementations can be expressed as methods, apparatuses, systems, components, program products, means or steps for performing a function, and in other ways.

These and other aspects, features, and implementations will become apparent from the following descriptions, including the claims.

DETAILED DESCRIPTION

Figure 1:
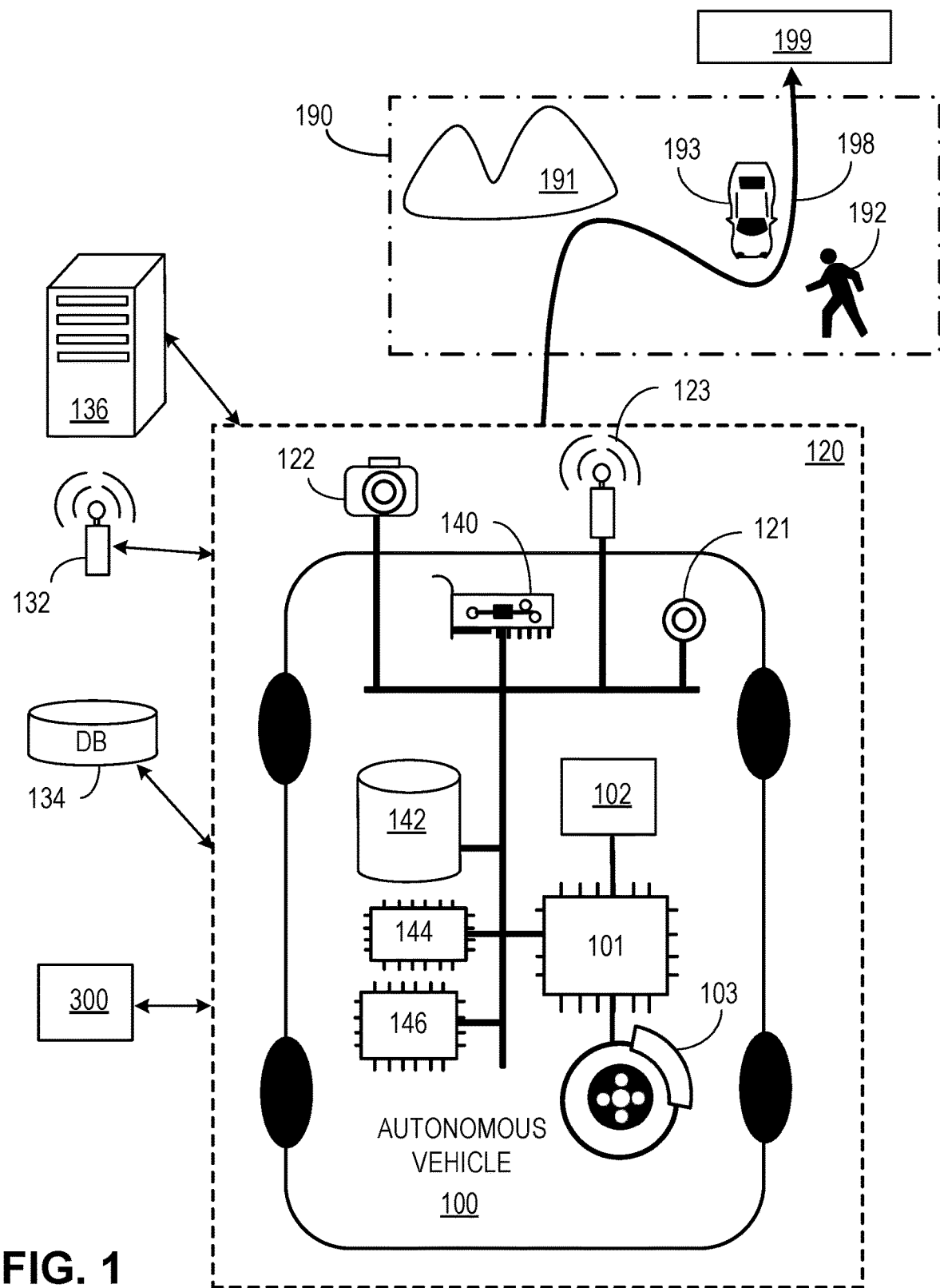
FIG. 1 shows an example of an autonomous vehicle having autonomous capability.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements.

For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. Hardware Overview
3. Autonomous Vehicle Architecture
4. Autonomous Vehicle Inputs
5. Autonomous Vehicle Planning
6. Autonomous Vehicle Control
7. Computing System for Object Detection Using Pillars
8. Example Point Clouds and Pillars
9. Example Process for Detecting Objects and Operating the Vehicle Based on the Detection of the Objects General Overview Autonomous vehicles driving in complex environments (e.g., an urban environment) pose a great technological challenge. In order for autonomous vehicles to navigate these environments, the vehicles detect various types of objects such as vehicles, pedestrians, and bikes in real-time using sensors such as LIDAR or RADAR. One approach for performing object detection on image inputs is deep learning. However, the sparsity of sensor inputs (e.g., LIDAR point clouds) makes existing image-based deep learning techniques computationally inefficient. The disclosed embodiments include a system and techniques for efficiently and quickly detecting 3D objects based on sensor inputs.

In particular, the system and techniques described herein implement machine learning (e.g., a neural network) that can handle the sparsity of a 3D point cloud by generating a representation of the 3D point cloud that uses virtual pillars, which are vertical columns that extend from a 2D grid on a 2D ground plane. Using virtual pillars as data structures for organizing the data points of the 3D point cloud, the system can generate a sparse pseudo-image that represents features of the 3D point cloud. The system can further process the pseudo-image using 2D convolutions, followed by an object detection neural network to detect objects in the environment. While traditional approaches require using 3D convolutions, the system and techniques described herein use 2D convolutions, thereby reducing computational complexity and accelerating training and inference. Further, the system can process pillars in parallel, leading to a vast improvement in speed compared to existing methods. In addition, by learning features directly from the point cloud using an encoder instead of fixed encoding, the disclosed techniques can leverage the full information represented by the 3D point cloud, thus allowing for higher performance (e.g., higher accuracy) and faster inference compared to existing object detection methods.

Hardware Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle, and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, WiFi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Figure 2:
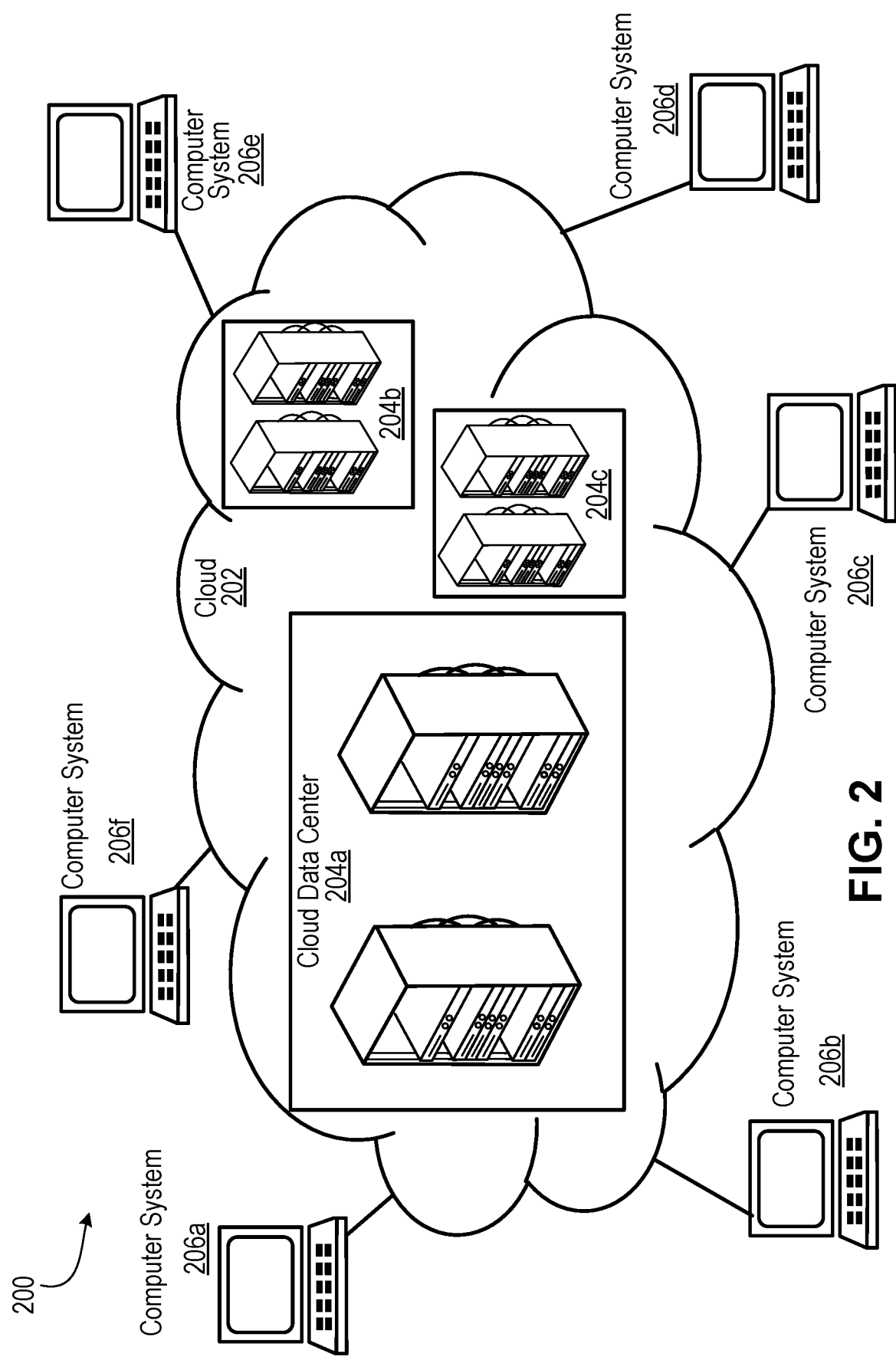
FIG. 2 illustrates an example "cloud" computing environment.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204*a*, 204*b*, and 204*c* that are interconnected through the cloud 202. Data centers 204*a*, 204*b*, and 204*c* provide cloud computing services to computer systems 206*a*, 206*b*, 206*c*, 206*d*, 206*e*, and 206*f* connected to cloud 202.

The cloud computing environment 200 includes one or more cloud data centers. In general, a cloud data center, for example the cloud data center 204*a* shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204*a* has many computing systems distributed through many racks.

The cloud 202 includes cloud data centers 204*a*, 204*b*, and 204*c* along with the network and networking resources (for example, networking equipment, nodes, routers, switches, and networking cables) that interconnect the cloud data centers 204*a*, 204*b*, and 204*c* and help facilitate the computing systems' 206*a-f* access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206*a-f* or cloud computing services consumers are connected to the cloud 202 through network links and network adapters. In an embodiment, the computing systems 206*a-f* are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206*a-f* are implemented in or as a part of other systems.

Figure 3:
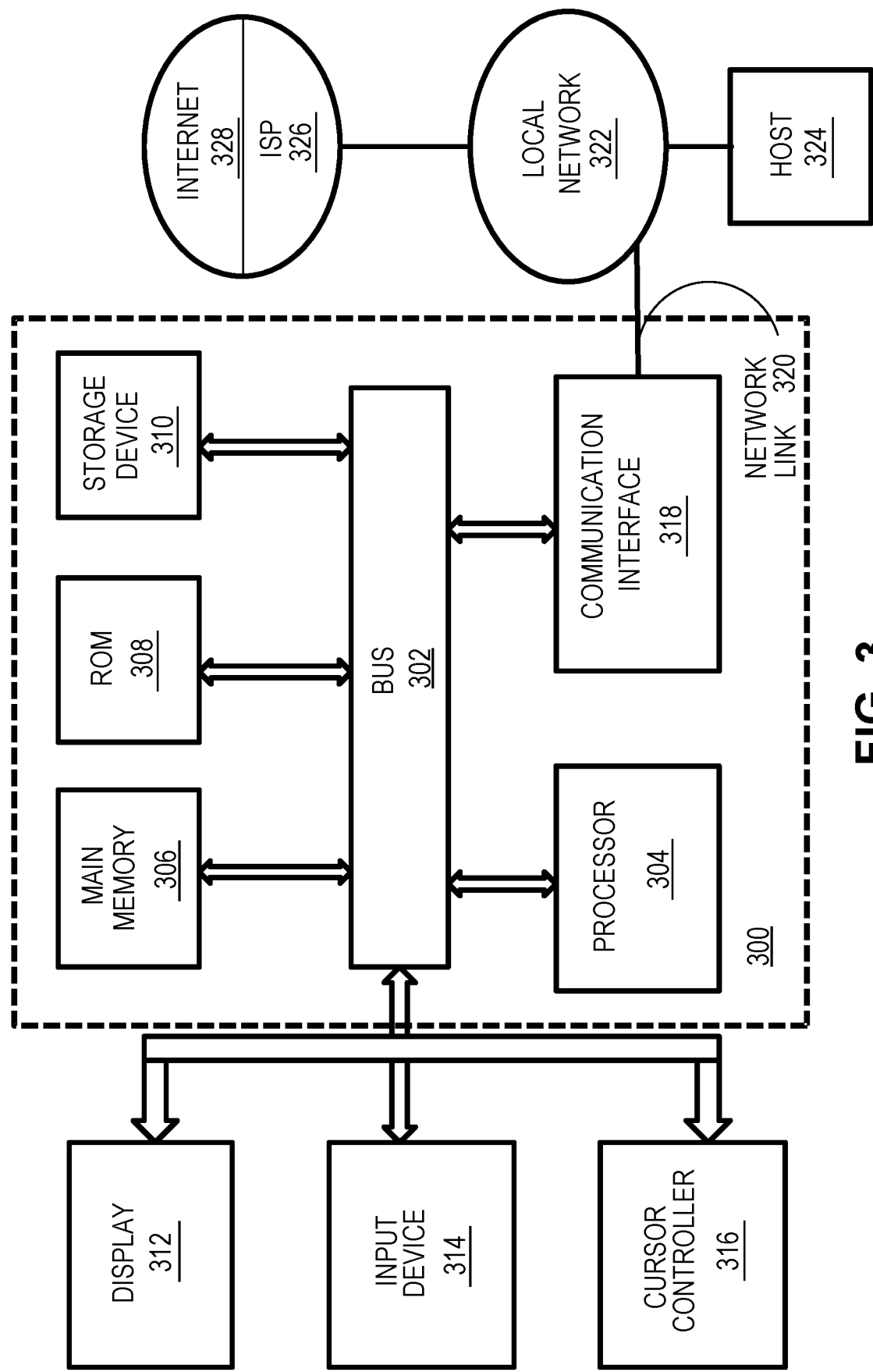
FIG. 3 illustrates a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
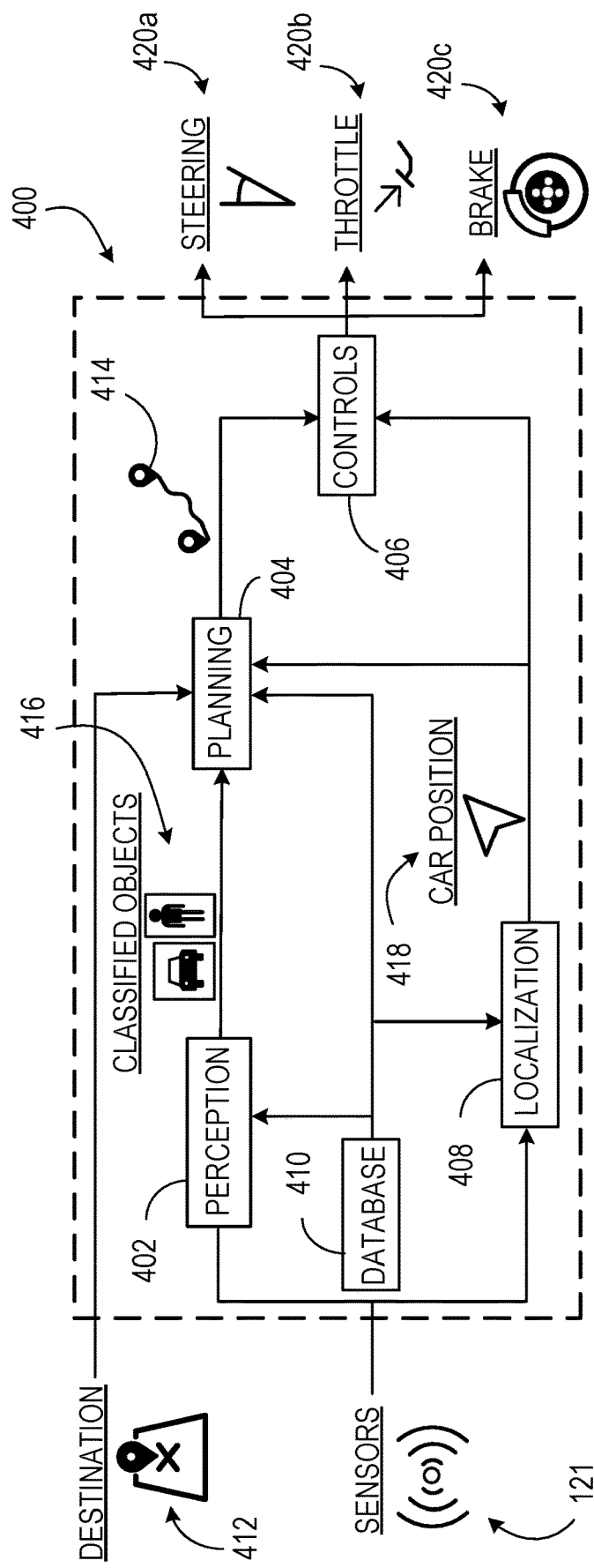
FIG. 4 shows an example architecture for an autonomous vehicle.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
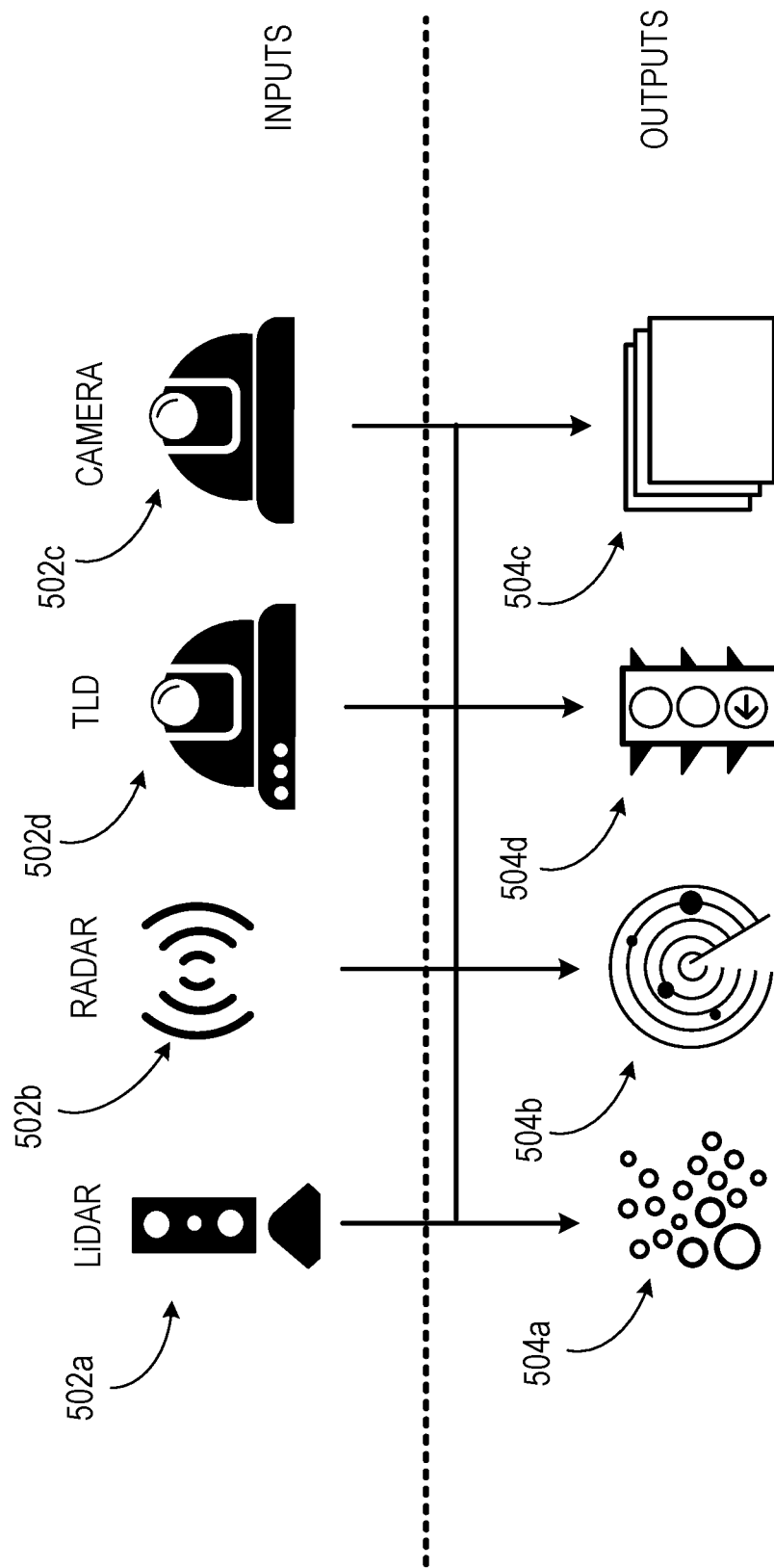
FIG. 5 shows an example of inputs and outputs that may be used by a perception module.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
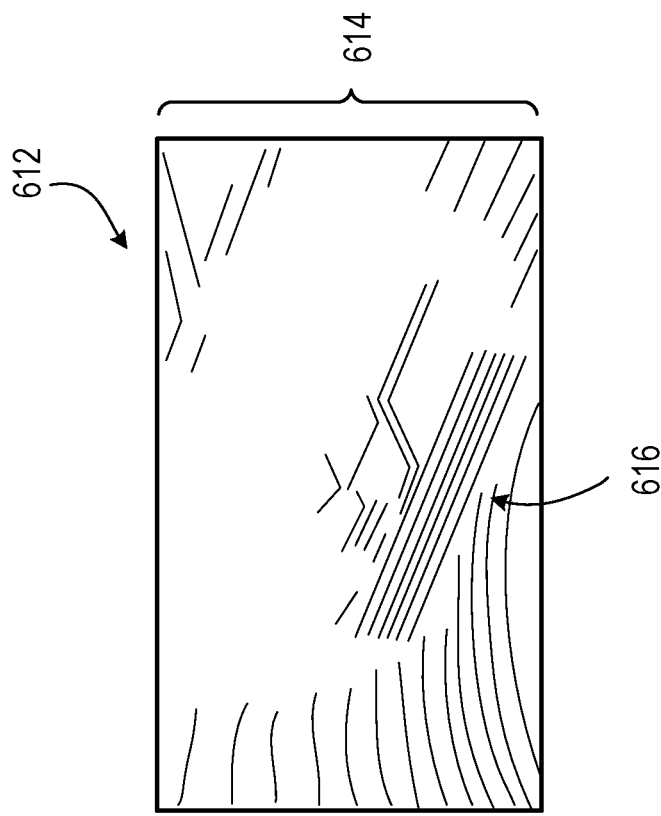
FIG. 6 shows an example of a LiDAR system.
Figure 6:
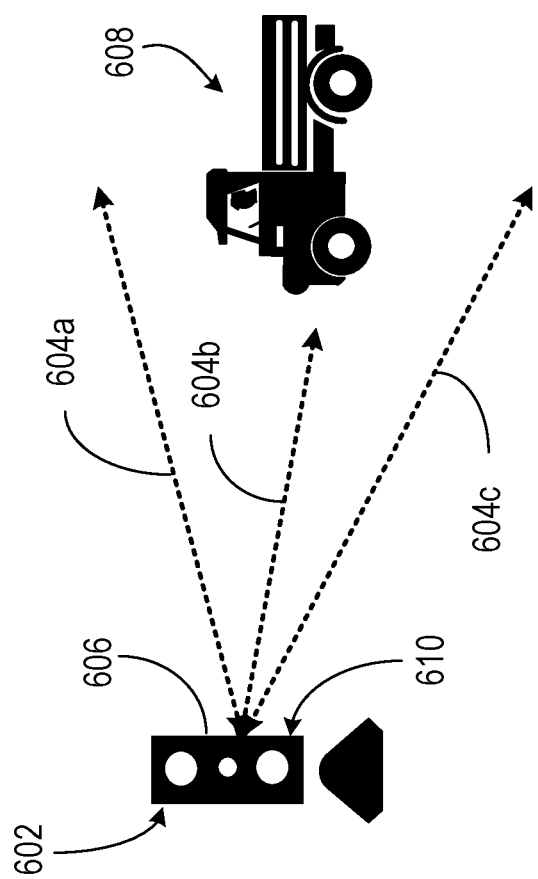

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
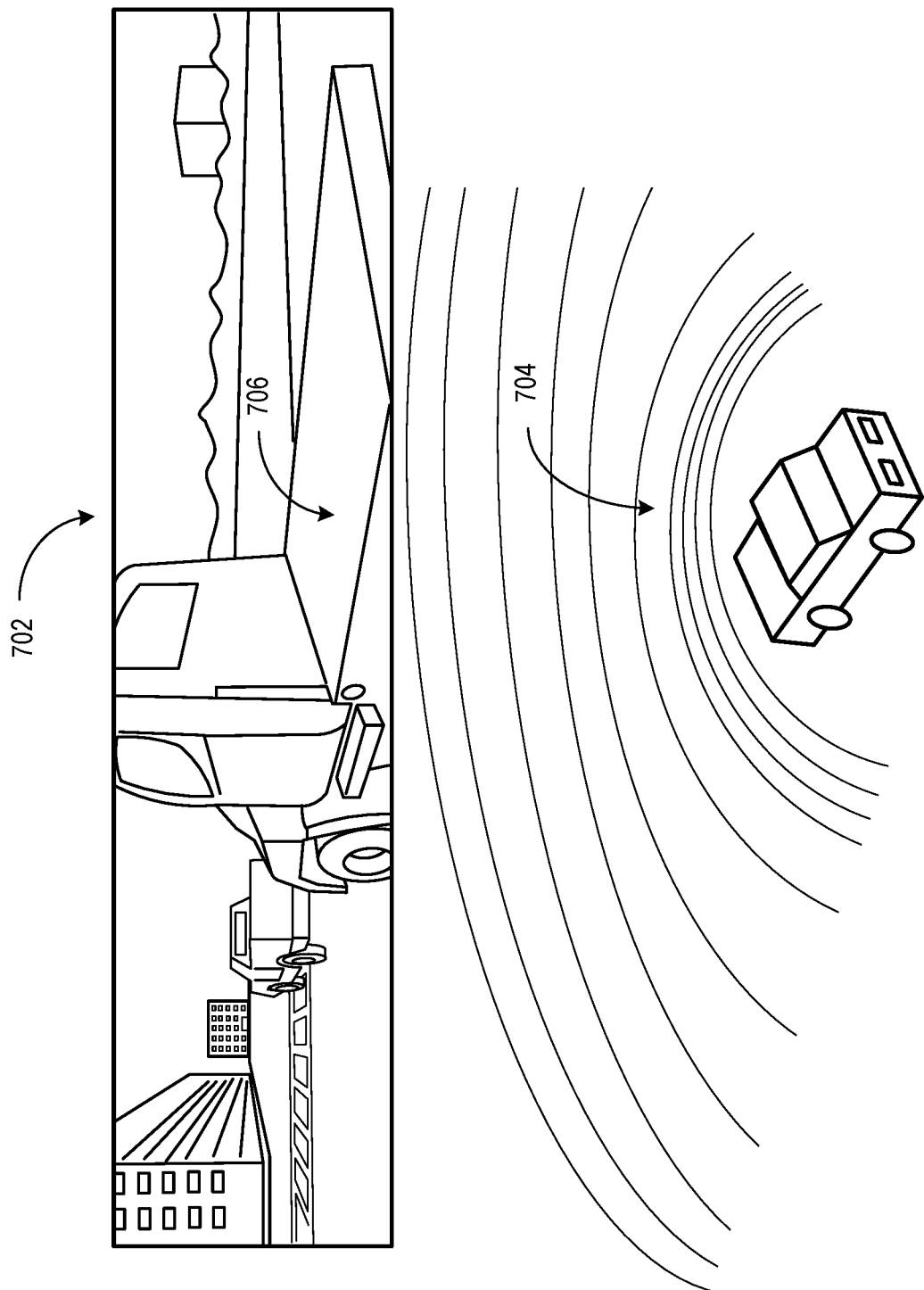
FIG. 7 shows the LiDAR system in operation.

FIG. 7 shows the LiDAR system 602 in operation. In the scenario shown in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
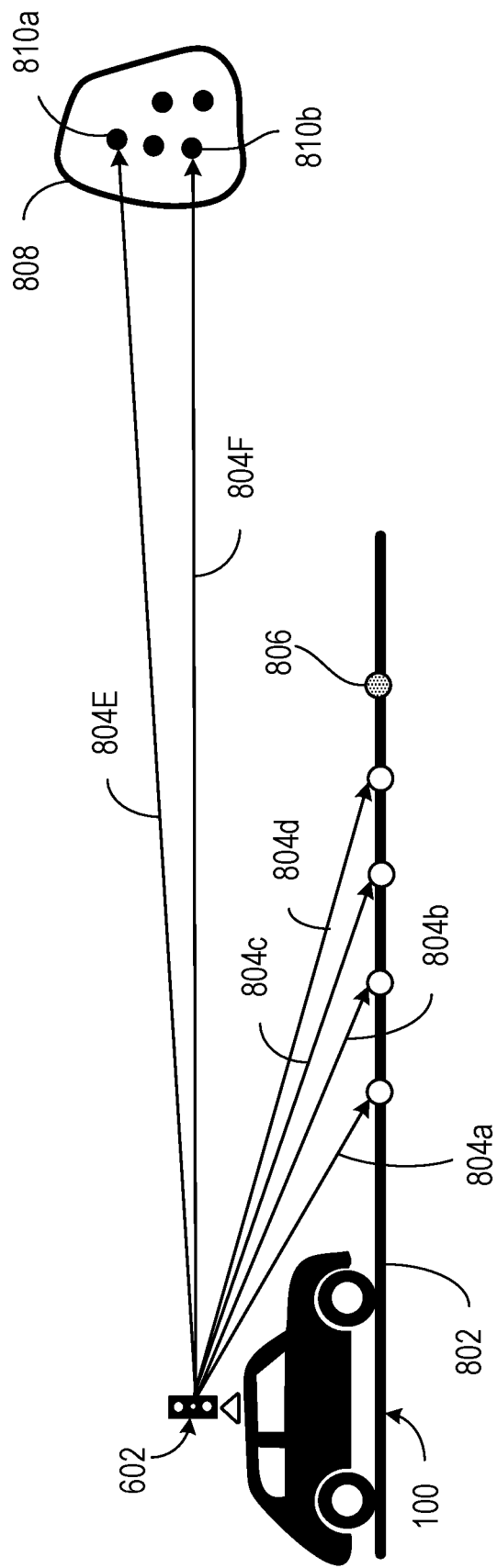
FIG. 8 shows the operation of the LiDAR system in additional detail.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the AV 100 can determine that the object 808 is present.

Path Planning

Figure 9:
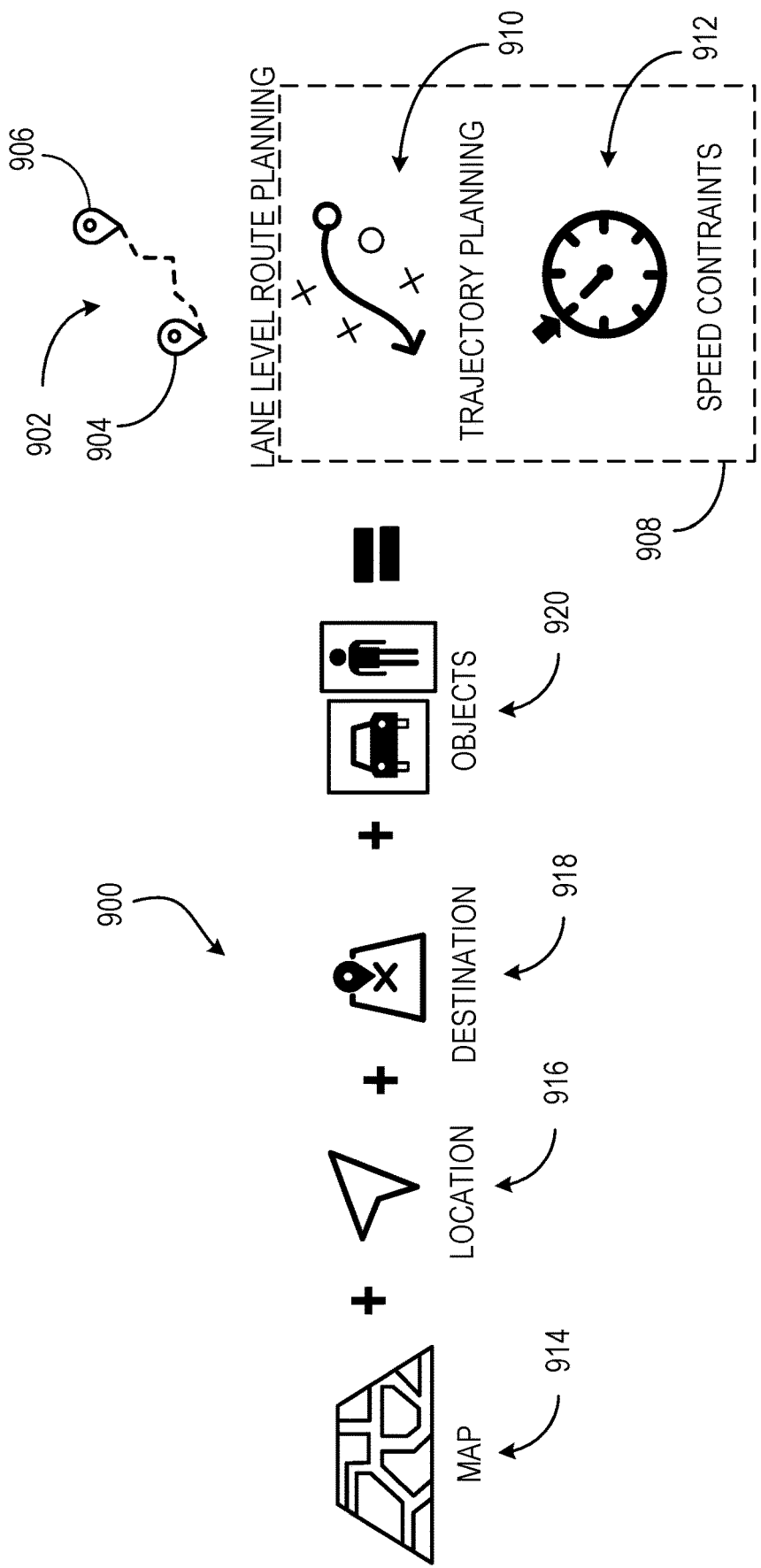
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
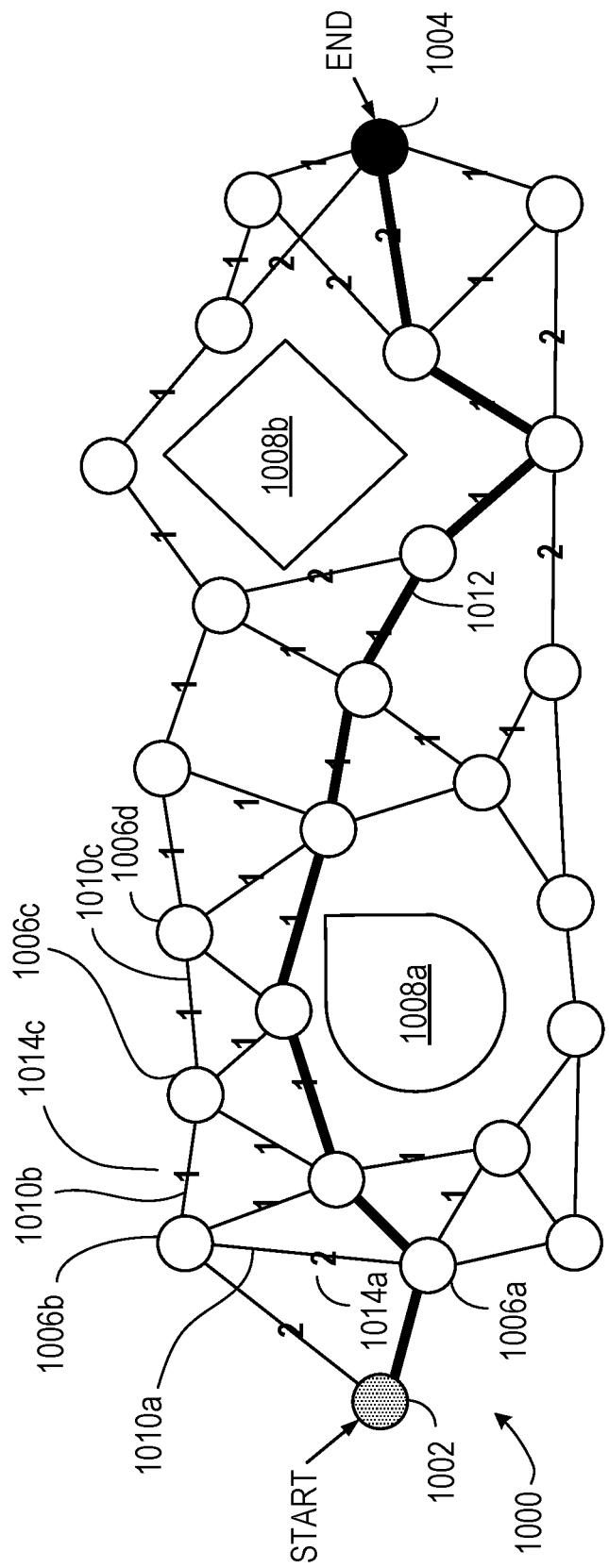
FIG. 10 shows a directed graph used in path planning.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the AV 100, e.g., other automobiles, pedestrians, or other entities with which the AV 100 cannot share physical space. In an embodiment, some or all of the objects 1008a-b are a static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an AV 100 to travel between one node 1006a and the other node 1006b, e.g., without having to travel to an intermediate node before arriving at the other node 1006b. (When we refer to an AV 100 traveling between nodes, we mean that the AV 100 travels between the two physical positions represented by the respective nodes.) The edges 1010a-c are often bidirectional, in the sense that an AV 100 travels from a first node to a second node, or from the second node to the first node. In an embodiment, edges 1010a-c are unidirectional, in the sense that an AV 100 can travel from a first node to a second node, however the AV 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the AV 100 chooses that edge. A typical resource is time. For example, if one edge 1010a represents a physical distance that is twice that as another edge 1010b, then the associated cost 1014a of the first edge 1010a may be twice the associated cost 1014b of the second edge 1010b. Other factors that affect time include expected traffic, number of intersections, speed limit, etc. Another typical resource is fuel economy. Two edges 1010a-b may represent the same physical distance, but one edge 1010a may require more fuel than another edge 1010b, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
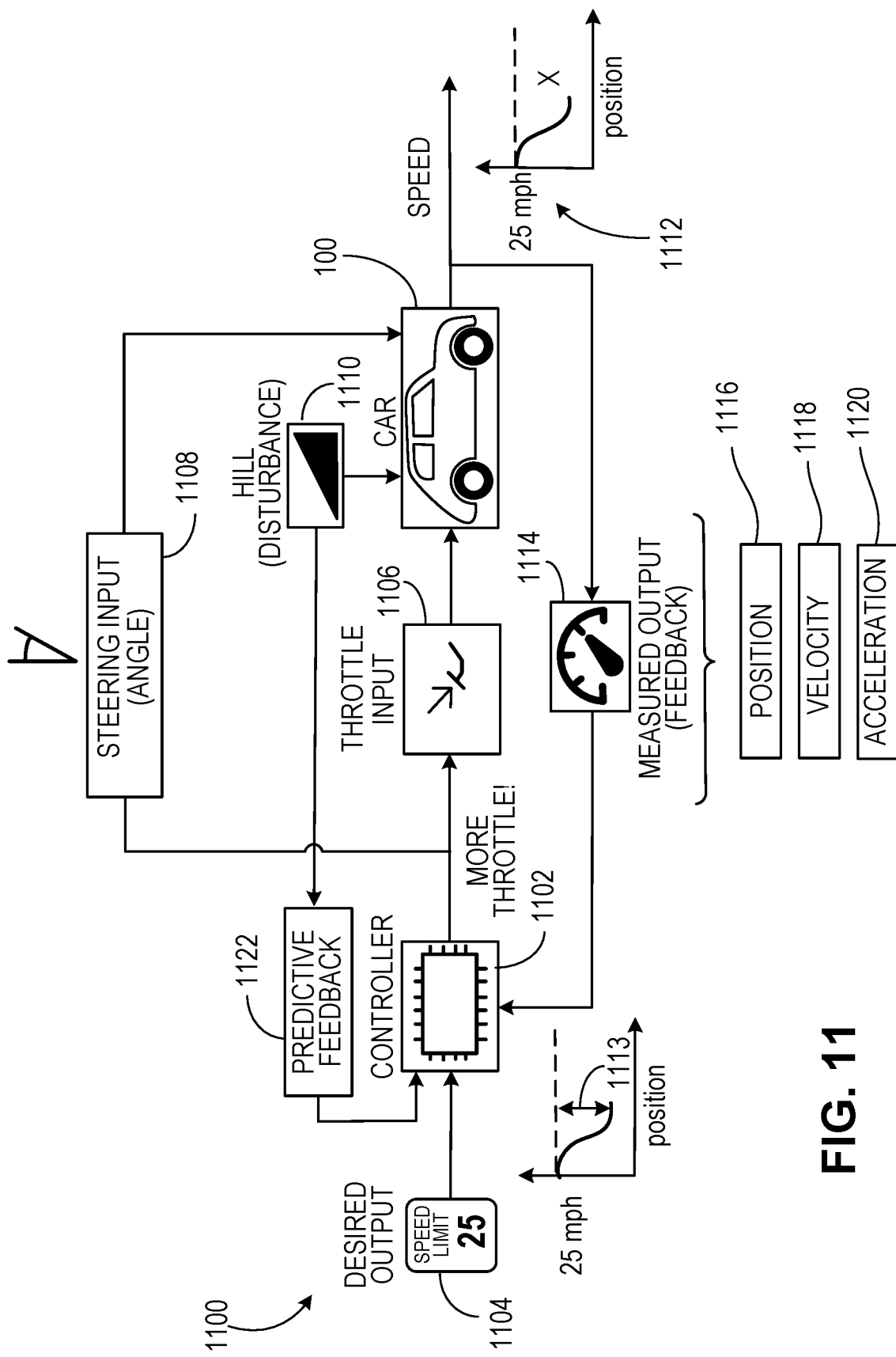
FIG. 11 shows a block diagram of the inputs and outputs of a control module.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 1308, and storage device 210, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
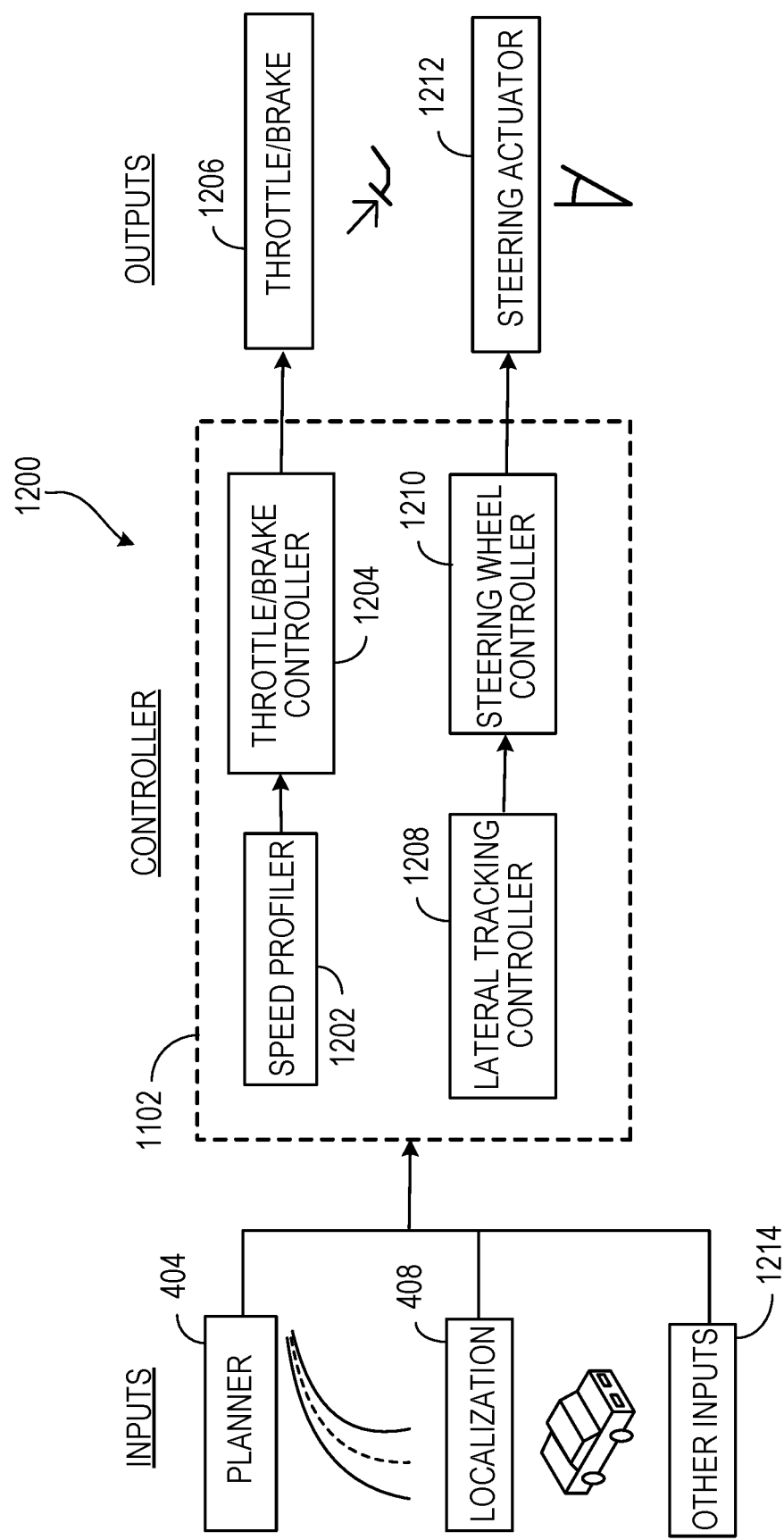
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1210 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Computer System for Object Detection

Figure 13:
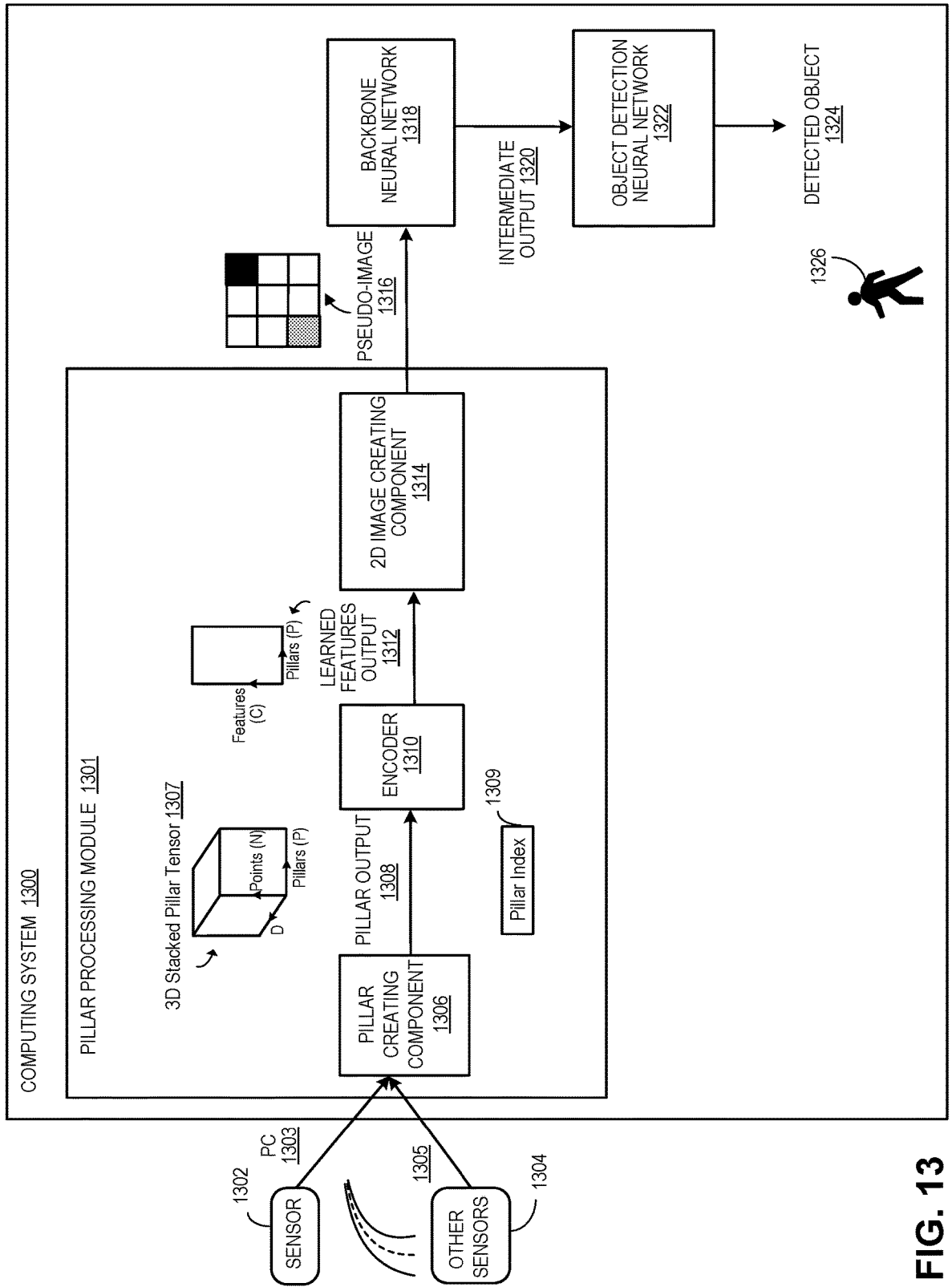
FIG. 13 shows an example architecture of a computing system for object detection using pillars.

FIG. 13 shows an example architecture of a computing system 1300 for object detection. In this example, the computer system 1300 can be located on an autonomous vehicle and be part of a larger computing system that algorithmically generates control actions based on real-time sensor data and prior information, allowing the vehicle to execute its autonomous driving capabilities. The computer system 1300 can be implemented in a similar manner as the computing devices 146 located on the AV 100 described with respect to FIG. 1.

Generally, a computer system 1300 is configured to receive an input from one or more sensors of the vehicle, detect one or more objects in the environment surrounding the vehicle based on the received input, and operate the vehicle based upon the detection of the objects. To detect the objects, the computing system 1300 implements a pillar processing module 1301, a backbone neural network 1318, and an object detection neural network 1322.

The pillar processing module 1301 includes a pillar creating component 1306, an encoder 1310, and a 2D image creating component 1314. The pillar creating component 1306 is configured to receive as input a set of measurements, for example, a point cloud 1303, from a sensor 1302 of the vehicle. In some embodiments, the sensor 1302 is a LIDAR, for example, the LIDAR 602 described with respect to FIGS. 6-8. In some embodiments, the sensor 1302 is a RADAR, for example, the RADAR 502b described with respect to FIG. 5. In an embodiment, the pillar creating component 1306 is configured to receive a merged point cloud that is generated by combining the point clouds from multiple LIDARS.

Figure 14:
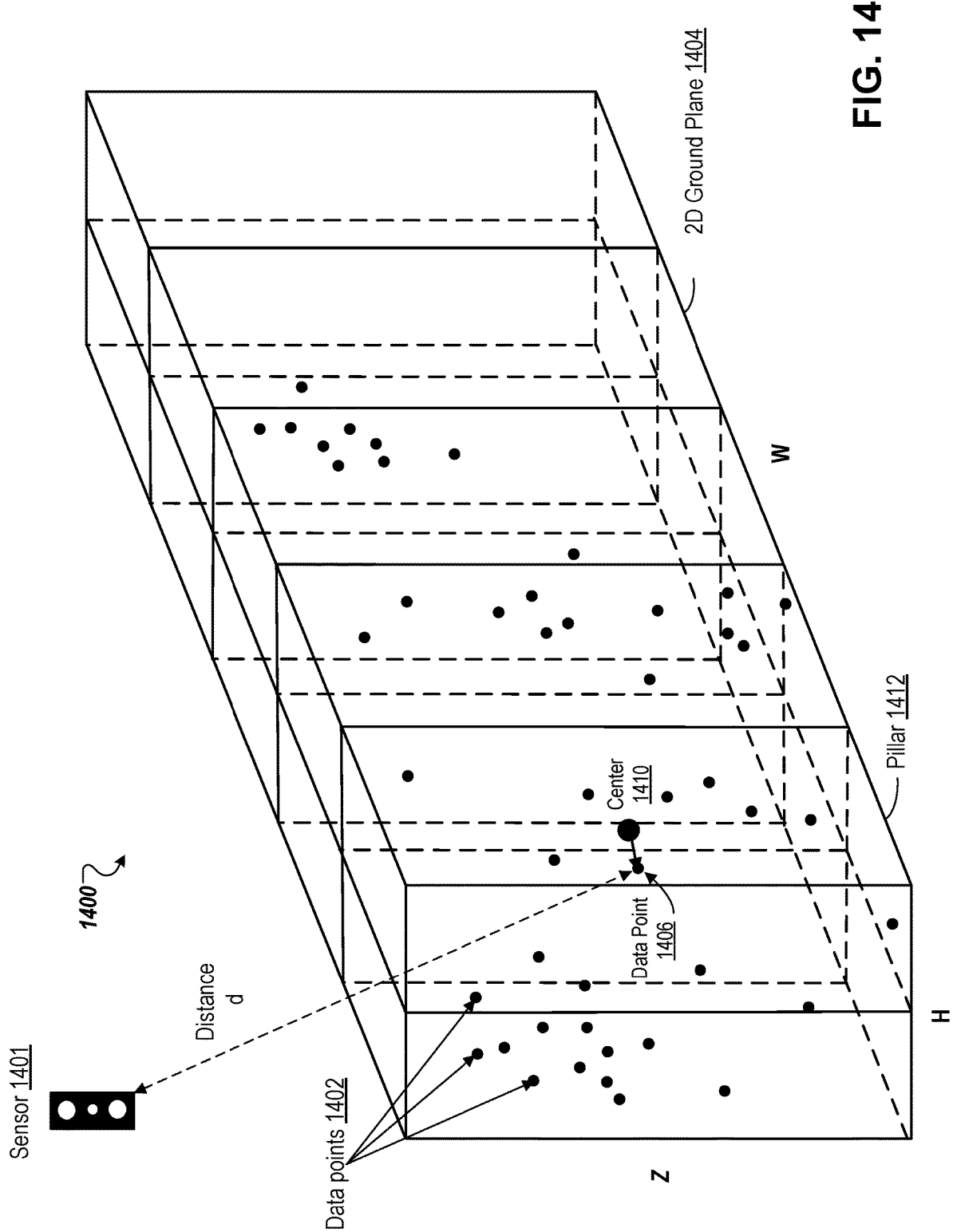
FIG. 14 illustrates an example point cloud and example pillars.

The point cloud 1303 includes a plurality of data points that represent a plurality of objects in 3D space surrounding the vehicle. For example, the plurality of data points represents a plurality of objects including one or more of a vehicle (e.g., a car, a bike or a truck), a pedestrian, an animal, a static object (for example, vegetation, buildings, etc.), or infrastructure (e.g., traffic lights). Each data point of the plurality of data points is a set of 3D spatial coordinates, for example, (x, y, z) coordinates. An example point cloud with a plurality of data points is illustrated in FIG. 14.

The pillar creating component 1306 is configured to divide the 3D space into a plurality of pillars. Each pillar of the plurality of pillar is a slice of the 3D space and each pillar extends from a respective portion of the 2D ground plane (e.g., the x-y plane) of the 3D space. In an embodiment, the 3D spatial coordinates are defined relative to the LiDAR coordinate frame. The x-y plane runs parallel to the ground, while z is perpendicular to the ground. In an embodiment, a pillar extends indefinitely up and down (z direction) corresponding to area below the ground and towards the sky in the environment. For example, in case of use of ground penetrating radars or other sensors that scan subsurface features the pillars extend downwards below the surface. Similarly, if the sensors include LiDARs with large fields of view or other sensors that scan a large area above the ground. In an embodiment, a pillar has a fixed minimum height and a fixed maximum height that corresponds to the observed environment including the ground and the tallest objects of interest.

In some embodiments, the pillar creating component 1306 divides the 2D ground plane into a 2D grid that has grid cells having the same size (e.g., square grid cells having sides of equal length), and therefore the pillars extending vertically (e.g., in the z-direction) in the 3D space from these 2D grid cells have the same volume. In an embodiment, the size of the grid cells is variable and can be determined based on the computational requirements. A coarser grid will be less accurate and require less computational resources. Similarly, a finer grid will lead to increased accuracy at the cost of increased computational resources. In an embodiment, the grid cells have sides of unequal length.

In some embodiments, the pillar creating component 1306 divides the 2D ground plane into a 2D grid with different grid cell sizes. For example, the component 1306 detects in the point cloud 1303 a density of objects using additional input 1305 from other sensors 1304 (e.g., a camera). The component 1306 can generate a 2D grid with different grid cell sizes so that there are more pillars located in a region of high object density, less pillars located in a region of low object density, and no pillars in a region of no objects.

Next, the pillar creating component 1306 assigns each data point of the plurality of data points to a pillar in the plurality of pillars. For example, each data point of the plurality of data points is assigned to a respective pillar based on the 2D coordinates of the data point. That is, if the 2D coordinates of a data point are within a particular portion of the 2D ground plane which a particular pillar extends from, the data point is assigned to that particular pillar.

After the data points are assigned to the pillars, the pillar creating component 1306 determines whether a first count of a plurality of non-empty pillars (pillars that have at least one data point) exceeds a threshold value P.

If the first count of the plurality of non-empty pillars exceeds P, the pillar creating component 1306 selects P non-empty pillars from the plurality of non-empty pillars. For example, the pillar creating component 1306 randomly subsamples P non-empty pillars from the plurality of non-empty pillars.

If the first count of non-empty pillars is less than the first threshold value P, the pillar creating component 1306 generates a second subset of empty pillars, such that a sum of the first count and a second count of the second subset of pillars is equal to P. The pillar creating component 1306 then selects P non-empty pillars from the plurality of non-empty pillars and the second subset of pillars.

For each non-empty pillar of the P non-empty pillars, the pillar creating component 1306 is configured to maintain a threshold number of data points in each non-empty pillar. To do this, the pillar creating component 1306 first determines, for each non-empty pillar of the P non-empty pillars, whether a third count of data points assigned to the non-empty pillar exceeds a second threshold value N.

For each non-empty pillar of the P non-empty pillars, if the third count of the data points assigned to the non-empty pillar exceeds the second threshold value N, the pillar creating component 1306 selects N data points to be maintained in the non-empty pillar. For example, the pillar creating component 1306 randomly subsamples N data points from the data points assigned to the non-empty pillar. In an embodiment, N is usually determined to be high enough such that there is a near statistical certainty (>99%) that one or more points from each object are captured in the point pillars. In an embodiment, different algorithms are used to further reduce the risk of missing an object during the sampling of data points. If the third count of the data points in the non-empty pillar is less than N, the pillar creating component 1306 assigns the non-empty pillar a plurality of zero coordinate data points, such that the sum of a fourth count of the plurality of zero coordinates and the third count equals N.

In some embodiments, the first threshold value P and the second threshold value N are predetermined values. In an embodiment, P and N are predetermined based on the distribution of data points such that a fraction of the data points is removed. In some embodiments, the first threshold value P and the second threshold value N are adaptive values. In particular, based on a density of the objects in the 3D space, the pillar creating component 1306 can adjust P and/or N such that there are more pillars and/or more data points allowed in each pillar in the region of high object density, less pillars and/or less data points in each pillar in the region of low object density, and no pillars in the region of no objects.

For each non-empty pillar of the plurality of non-empty pillars, the pillar creating component 1306 generates a plurality of modified data points based upon the plurality of data points in each non-empty pillar. In particular, for each non-empty pillar, the pillar creating component 1306 generates, for each data point in the non-empty pillar, a respective modified data point based on a relative distance between the data point and a center of the non-empty pillar. The center of the pillar is chosen such that the coordinate systems of the modified data points and the neural network used in subsequent processing is aligned. In an embodiment, the pillar creating component 1306 generates, for each data point in the non-empty pillar, a respective modified data point based on the relative distance between the data point and the center of the non-empty pillar, and further based on a cylindrical Euclidean distance from the sensor 1302 to the data point. The pillar creating component 1306 then transforms the plurality of data points in each non-empty pillar to the plurality of modified data points generated for that non-empty pillar. In an embodiment, for each non-empty pillar, the pillar creating component 1306 generates, for each data point in the non-empty pillar, a respective modified data point based on a relative distance between the data point the center of gravity (mean location) of the points in the pillar.

For example, in an embodiment, each data point of the plurality data points is represented by 3D spatial coordinates (x, y, z), a reflectance (r), and a time stamp (t). The pillar creating component 1306 transforms each data point (x, y, z, r, t) in a non-empty pillar to a respective modified data point ($x_{offset}$, $y_{offset}$, z, r, t, d), where $x_{offset}$ and $y_{offset}$ are measured based on a relative distance between the data point and the center of the non-empty pillar, z is the height of the data point in the non-empty pillar, t is a timestamp, and d is a distance metric such as, for example, the cylindrical Euclidean distance from the sensor 1302 to the data point. Other distance metrics are also possible. Each modified data point has D dimensions, where D is equal to the number of dimensions of the modified data point. In this example embodiment, each modified data point has D=6 dimensions: $x_{offset}$, $y_{offset}$, z, r, t, and d.

In an embodiment, the pillar creating component 1306 assigns a pillar index to each of the P non-empty pillars and a data point index to each of the modified data points in the P non-empty pillars. The pillar creating component 1306 generates a P dimensional pillar index vector 1309 that maps the pillar index of each pillar to a corresponding location (e.g., a corresponding grid cell) in the original 2D grid from which the pillar vertically extends.

In an embodiment, the pillar creating component 1306 generates, for all non-empty pillars and all modified data points, a 3D stacked pillar tensor 1307, which is a (D, P, N) dimensional tensor having a modified data point coordinate, a pillar index coordinate, and a data point index coordinate. For each of the modified data points in the P non-empty pillars, the 3D stacked pillar tensor 1307 maps a pillar index of the pillar that includes the modified data point and a data point index of the modified data point to the modified data point.

The pillar creating component 1306 then generates a pillar output 1308 that includes the 3D stacked pillar tensor 1307 and the P dimensional pillar index vector 1309.

In an embodiment, the encoder 1310 is a neural network that is configured to receive the pillar output 1308 and to process the 3D stacked pillar tensor 1307 to generate a learned features output 1312 that characterizes the features of the point cloud 1303.

In particular, to generate the learned features output 1312, the encoder 1310 initializes a current 3D feature tensor using the 3D stacked pillar tensor 1307, and iteratively performs the following steps K times, where K is a predetermined number:

1. Applying a 1×1 convolution across the modified data point index coordinate and the pillar index coordinate (i.e., across the (N, P) canvas) of the current 3D feature tensor to generate a first tensor T with size ($C^K$, N, P).
2. Applying an element-wise maximum operator across the modified data point index coordinate of the first tensor T to generate a max matrix M with size ($C^K$, P). In particular, the max matrix M is calculated across all modified data points in each pillar such that:

$$M_{c^K,p} = \max_n T_{c^K,n,p} \quad (1)$$

3. Determining whether the current iteration is the $K^{th}$ iteration.
   a) If the current iteration is the $K^{th}$ iteration, outputting the current max matrix M as the learned features output 1312 of the encoder 1310. The output 1312 is a ($C^K$, P) tensor.
   b) If the current iteration is not the $K^{th}$ iteration, generating a second ($C^K$, N, P) tensor $T_{max}$ by repeating the max matrix M for N times along the second dimension (i.e., the modified data point index coordinate) of the first tensor T, where N is the threshold number of data points in each pillar.
4. Concatenating the second tensor $T_{max}$ with the first tensor T along the first dimension (i.e., the modified data point coordinate) to generate a third tensor T' with size ($2C^K$, N, P).
5. Setting the current 3D feature tensor as the third tensor T'.

After performing the K iterations, the encoder 1310 obtains the learned features output 1312, which is a (C, P) tensor that includes P feature vectors, each feature vector having size C.

The 2D image creating component 1314 is configured to receive the learned features output 1312 from the encoder 1310 and to process the learned features output 1312 to generate the pseudo-image 1316. The pseudo-image 1316 is a 2D image that has more channels (e.g., 32, 64, or 128 channels) than a standard RGB image with 3 channels.

In particular, the 2D image creating component 1314 uses the P dimensional pillar index vector 1309 to scatter the dense (C, P) tensor to a plurality of locations on the pseudo-image 1316 as shown in FIG. 13. That is, for each feature vector of size C in the dense (C, P) tensor, the image creating component 1314 looks up the 2D coordinates of the feature vector using the P dimensional pillar index vector 1309, and places the feature vector into the pseudo-image 1316 at the 2D coordinates. As a result, each location on the pseudo-image 1316 corresponds to one of the pillars and represents features of the data points in the pillar.

By converting a sparse point cloud 1303 into the dense pseudo-image 1316 that is compatible with a standard 2D convolutional architecture, the system 1300 can efficiently and quickly process the pseudo-image by taking advantage of the processing power and speed of convolutional neural networks (CNNs) and GPUs. As shown in FIG. 13, the backbone neural network 1318 is configured to process the pseudo-image 1316 to generate an intermediate output 1320 that characterizes features of the pseudo-image 1316. In an embodiment, the backbone neural network is a 2D CNN that includes one or more neural network layers. The one or more neural network layers may include one or more of (i) a 3×3 convolutional neural network layer, (ii) a Rectified Linear Unit (ReLU) neural network layer, and (ii) a batch normalization neural network layer. In an embodiment, the intermediate output 1320 is a feature map that has more channels than the pseudo-image 1316. For example, the pseudo-image 1316 has 32 channels, and the intermediate output 1320 has 512 channels. As another example, the pseudo-image 1316 has 32 channels, and the intermediate output 1320 has 256 channels.

The object detection neural network 1322 is configured to receive the intermediate output 1320 from the backbone neural network 1318 and to process the intermediate output 1320 to detect one or more objects (e.g., the object 1324) in the 3D space surrounding the sensor 1302. Generally, the object detection neural network 1322 is a feed-forward convolutional neural network that, given the output 1320 from the backbone neural network 1318, generates a set of bounding boxes for potential objects in the 3D space and classification scores for the presence of object class instances (e.g., cars, pedestrians, or bikes) in these bounding boxes. The higher the classification score, the more likely the corresponding object class instance is present in a box. An example object detection neural network 1322 is described in detail in W. Liu, D. Anguelov, D. Erhan, C. Szegedy, S. Reed, C. Y. Fu, and A. C. Berg. SSD: Single Shot Multibox Detector. Springer, 201, available at https://arxiv.org/pdf/1512.02325.pdf.

The computing system 1300 operates the vehicle based upon the detection of the objects in the 3D space surrounding the vehicle. For example, the system 1300 can control the vehicle to drive around the detected object or to change lane to avoid collision with the object.

In an embodiment, upon the detection of the object 1324, the computing system 1300 provides information about the object to a predictive feedback module, for example, the module 1122 described with respect to FIG. 11. The predictive feedback module then provides information to a controller of the vehicle (e.g., the controller 1102 of FIG. 11) and the controller can use the information to adjust operations of the vehicle accordingly. For example, if the computing system 1300 detects a pedestrian 1326 crossing the road segment, the controller receives the information about the pedestrian 1326 and prepares to engage the throttle/brake at the appropriate time to reduce the speed of the vehicle. As another example, if the computing system 1300 detects unexpected traffic such as multiple cars on the same lane, the computing system 1300 can transmit the traffic information to the predictive feedback module. This information can be used by the controller to adjust the steering wheel, steering angle actuator, or other functionality for controlling steering angle, such that the vehicle changes to another lane with less traffic.

Example Point Clouds and Pillars

FIG. 14 illustrates an example point cloud and pillars.

The point cloud 1400 has a plurality of data points 1402. In this embodiment, each data point is a 5-dimensional data point having a spatial location (x, y, z), reflectance (r), and time stamp (t). The time stamp allows multiple LIDAR or RADAR sweeps to accumulate data points as inputs for a single prediction/detection of the objects. Each of the data points is assigned into one of the B=H×W pillars. Each pillar is a z-column that extends from a portion of the 2D ground plane 1404 in the z direction. As described above in reference to FIG. 13, a pillar processing module is configured to transform each of the data points having an original presentation to a respective modified data point having a different presentation. For example, as shown in FIG. 14, data point 1406 in a non-empty pillar 1412 has an original 5-dimensional representation including 3D spatial coordinates (x, y, z), a reflectance (r), and a time stamp (t). The pillar processing module transforms the data point 1406, represented by (x, y, z, r, t), to a respective modified data point represented by ($x_{offset}$, $y_{offset}$, z, r, t, d), where $x_{offset}$ and $y_{offset}$ are measured based on a relative distance between the data point 1406 and the center 1410 of the non-empty pillar 1412, where z is the height of the data point in the non-empty pillar, r is the reflectance, t is the timestamp, and d is the cylindrical Euclidean distance from a sensor 1401 to the data point 1406.

In an embodiment, the 2D ground plane 1404 is divided into multiple grid cells having the same dimensions, and thus the plurality of pillars extending vertically (in the Z-direction) from these grid cells also have the same volume. However, in other embodiments, the 2D ground plane can be divided into multiple grid cells having different sizes as shown in FIG. 15 below.

Figure 15:
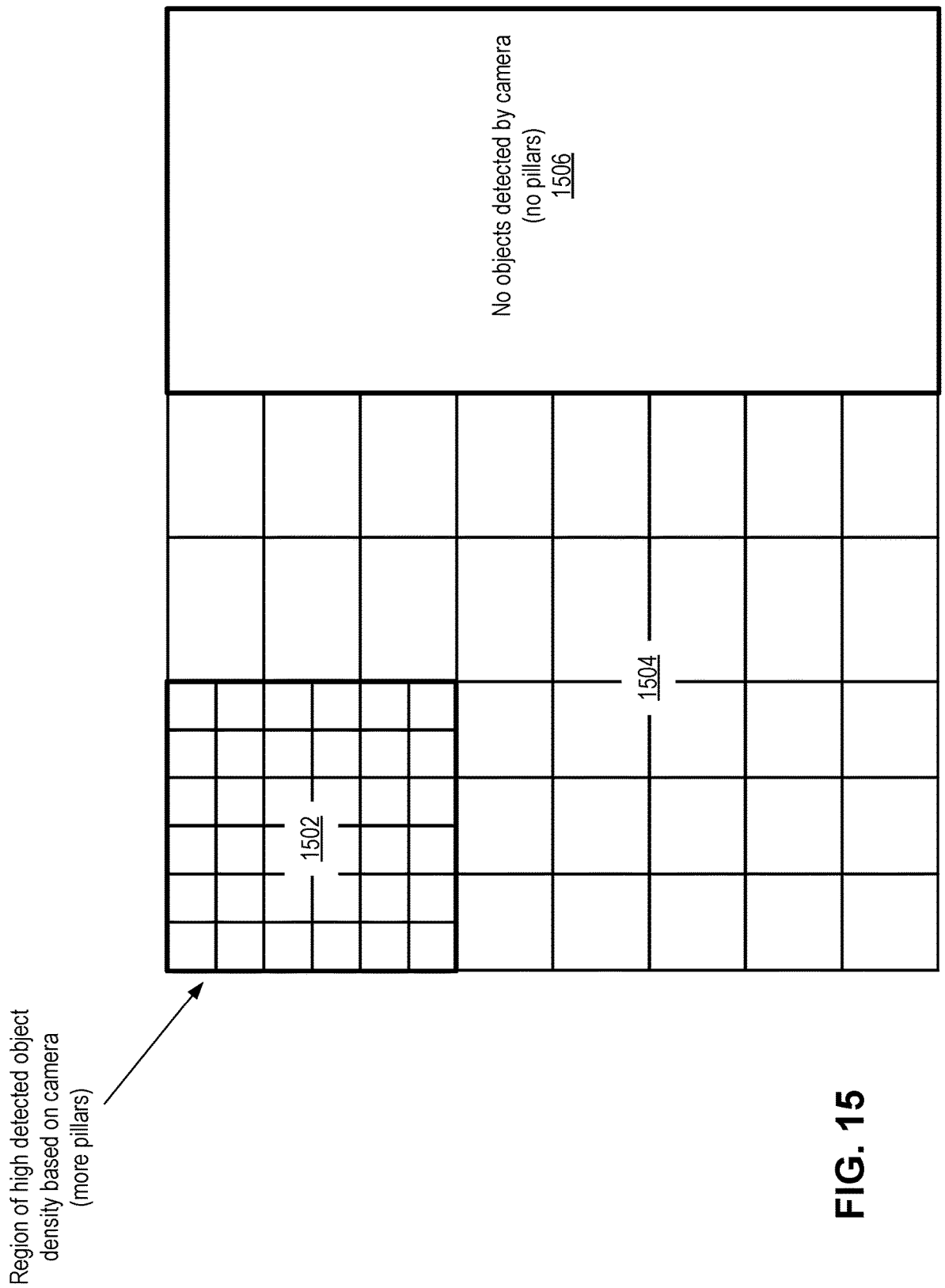
FIG. 15 illustrates an example 2D plane of a point cloud.

FIG. 15 illustrates an example 2D ground plane of a point cloud. The 2D ground plane is divided into multiple grid cells that have different cell sizes, depending on the density of objects in the 3D space.

As shown in FIG. 15, region 1502 has a high density of detected objects based on another sensor of the vehicle (e.g., a camera, RADAR, sonar). Therefore, region 1502 has a smaller grid cell size, which means there are more pillars in the region 1502 to capture more information about the objects in the region 1502. In an embodiment, each pillar in the region 1502 has more data points allowed in each pillar than other regions with lower object density. In contrast, region 1506 does not have any objects detected by the camera. Thus there is no pillar in the region 1506. Region 1504 has a moderate density of detected objects, therefore having more pillars than region 1506 but less pillars than the region 1502. Generally, the threshold value N is greater for pillars located in the region of high object density and smaller for pillars located in the region of low object density.

Figure 16:
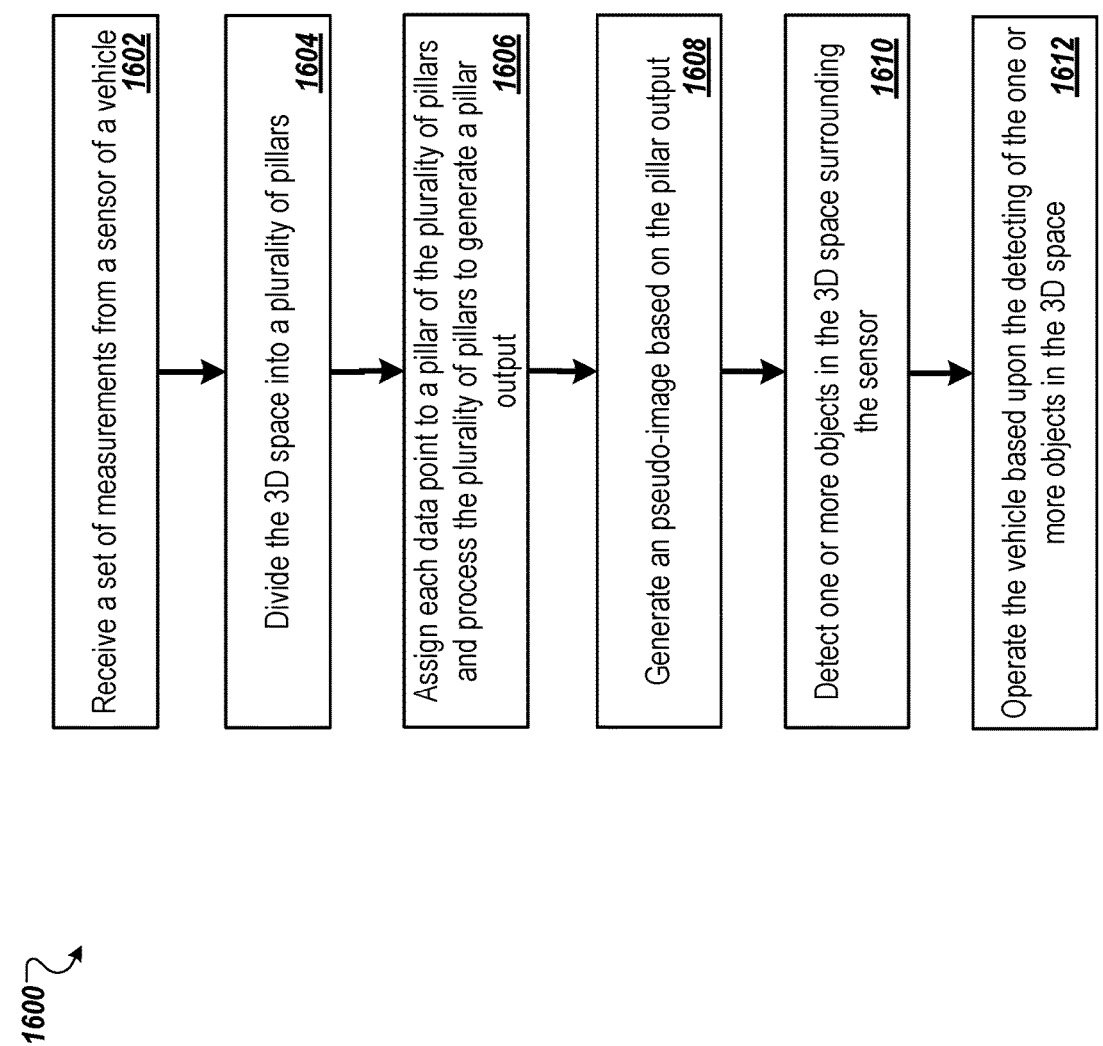
FIG. 16 is a flow chart of an example process for detecting objects in the environment and operating the vehicle based on the detection of the objects.

Example Process for Detecting Objects and
Operating the Vehicle Based on the Detection of
the Objects FIG. 16 is a flow chart of an example process 1600 for detecting objects in the environment and operating the vehicle based on the detection of objects. For convenience, the process 300 will be described as being performed by a system of one or more computers located in one or more locations. For example, the computing system 1300 of FIG. 13, appropriately programmed in accordance with this specification, can perform the process 1600.

Process 1600 begins when the system receives a set of measurements from a sensor of a vehicle (step 1602). In particular, the system receives a point cloud from a LIDAR or RADAR. The point cloud includes a plurality of data points that represent a plurality of objects in a 3D space surrounding the vehicle. For example, the plurality of data points represent a plurality of objects including one or more of a vehicle (e.g., a car, a bike or a truck), a pedestrian, an animal, a static obstacle, or infrastructure (e.g., traffic lights). Each data point of the plurality of data points is a set of 3D spatial coordinates, for example, (x, y, z) coordinates.

Process 1600 continues when the system divides the 3D space into a plurality of pillars (step 1604). Each pillar of the plurality of pillars extends vertically from a respective portion of the 2D ground plane (e.g., the x-y plane) of the 3D space. In some embodiments, the system divides the 2D ground plane into a 2D grid that has grid cells having the same size, and therefore the pillars extending vertically (in the z-direction) from these 2D grid cells have the same volume. In some embodiments, the system divides the 2D ground plane into a 2D grid with different grid cell sizes. For example, system detects in the point cloud a density of objects using additional input from other sensors such as a camera or RADAR. The system generates a 2D grid with different grid cell sizes so that there are more pillars located in the region of high object density, less pillars located in the region of low object density, and no pillars in the region of no objects.

Process 1600 continues when the system assigns each data point of the plurality of data points to a pillar in the plurality of pillars and process the plurality of pillar to generate a pillar output (step 1606). Generally, each data point of the plurality of data points is assigned to a respective pillar based on the 2D coordinates of the data point. That is, if the 2D coordinates of a data point are within a particular portion of the 2D ground plane from which a particular pillar extends, the data point is assigned to that particular pillar. The system then transforms each of the data points into a respective modified data point based on a relative distance between each data point and the center of the point pillar that includes the data point and a cylindrical Euclidean distance from the sensor to the data point. The system processes the plurality of pillars and modified data points to generate a pillar output that includes a 3D stacked pillar tensor and a P dimensional pillar index vector. The process for assigning data points to the plurality of pillars and processing the plurality of pillars to generate the pillar output is described in detail below with reference to FIG. 17.

Process 1600 continues when the system generates a pseudo-image based on the pillar output (step 1608). The system generates a learned features output that characterizes features of the plurality of pillars and processes the learned features output to generate the pseudo-image.

To generate the learned features output, the system initializes a current 3D feature tensor using the 3D stacked pillar tensor, and iteratively performs the steps K times, as described in reference to FIG. 13.

Process 1600 continues when the system detects the plurality of objects in the 3D space surrounding the sensor based on analyzing the pseudo image (step 1610). In an embodiment, the system detects the plurality of objects using a backbone neural network and an object detection neural network. In particular, the system processes the pseudo-image using a backbone neural network to generate an intermediate output, as described in reference to FIG. 13. The system processes the intermediate output using the object detection neural network to detect one or more objects in the 3D space surrounding the sensor. In an embodiment, the object detection neural network is a feed-forward CNN that, given the intermediate output, generates a set of bounding boxes for potential objects in the 3D space and classification scores for the presence of object class instances (e.g., cars, pedestrians, or bikes) in these bounding boxes. The higher the classification score, the more likely the corresponding object class instance is present in a bounding box.

Process 1600 continues when the system operates the vehicle based upon the detecting of the plurality of objects in the 3D space surrounding the vehicle (step 1612). For example, the system controls the vehicle to drive around the detected object or to change lanes to avoid the object. In an embodiment, upon the detection of an object, the system provides information about the object to a predictive feedback module. The predictive feedback module then provides information to a controller of the vehicle and the controller uses the information to adjust operations of the vehicle accordingly. For example, if the system detects a pedestrian crossing the road segment, the controller receives the information about the pedestrian and prepares to engage the throttle or brake at the appropriate time to reduce the speed of the vehicle. As another example, if the system detects an unexpected traffic, such as multiple cars on the same lane, the system can transmit the traffic information to the predictive feedback module. This information is used by the controller to adjust the steering wheel, steering angle actuator, or other functionality for controlling steering angle, such that the vehicle changes to another lane with less traffic.

Figure 17:
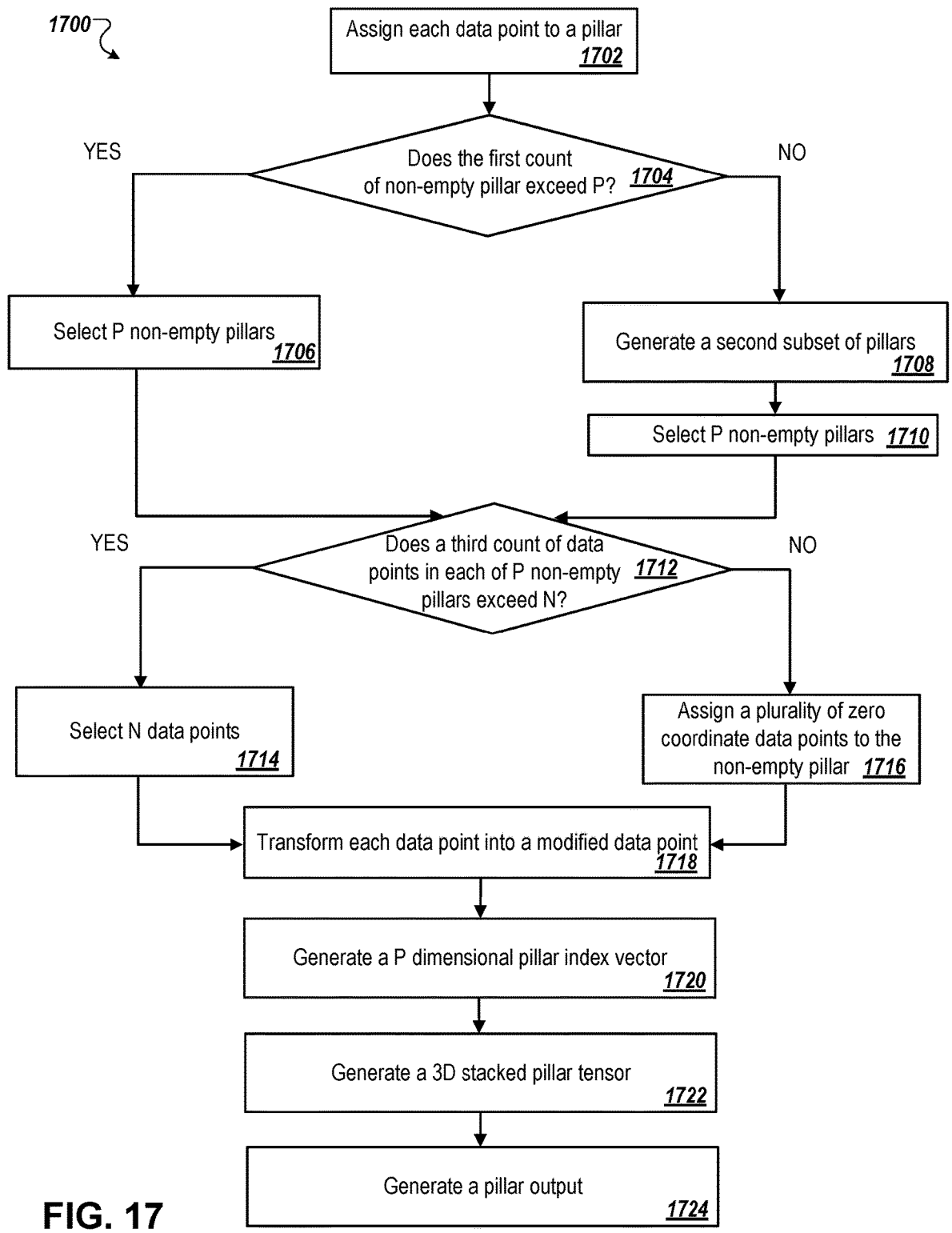
FIG. 17 is a flow chart of an example process for assigning data points into a plurality of pillars and to process the plurality of pillars to generate a pillar output.

FIG. 17 is a flow chart of an example process 1700 for assigning each of the plurality of data points to a pillar of the plurality of pillars and processing the plurality of pillars to generate a pillar output. For convenience, the process 200 will be described as being performed by a system of one or more computers located in one or more locations. For example, the computing system 1300 of FIG. 13, appropriately programmed in accordance with this specification, can perform the process 1700.

Process 1700 begins when the system assigns each data point of the plurality of data points to a pillar in the plurality of pillars (step 1702). Generally, each data point of the plurality of data points is assigned to a respective pillar based on the 2D coordinates of the data point. That is, if the 2D coordinates of a data point are within a particular portion of the 2D ground plane from which a particular pillar extends, the data point is assigned to that particular pillar.

Process 1700 continues when the system determines whether a first count of a plurality of non-empty pillars (pillars that has at least one data point) exceeds a threshold value P (step 1704). If the first count of the plurality of non-empty pillars exceeds P, the system selects P non-empty pillars from the plurality of non-empty pillars (step 1706). For example, the system randomly subsamples P non-empty pillars from the plurality of non-empty pillars. If the first count of non-empty pillars is less than the first threshold value P, the system generates a second subset of pillars such that a sum of the first count and a second count of the second subset of pillars is equal to P (step 1708). The system then selects P non-empty pillars from the plurality of non-empty pillars and the second subset of pillars (step 1710).

For each non-empty pillar of the P non-empty pillars, the system is configured to maintain a threshold number of data points in each non-empty pillar. To do this, for each of the P non-empty pillars, the system performs the following set of operations (step 1712 and step 1714 or 216). The system first determines, for each of the P non-empty pillars, whether a third count of data points assigned to the non-empty pillar exceeds a second threshold value N (step 1712). If the third count of the data points assigned to the non-empty pillar exceeds the second threshold value N, the system selects N data points to be maintained in the non-empty pillars (step 1714). For example, the system randomly subsamples N data points from the data points assigned to the non-empty pillar. If the third count of the data points in the non-empty pillar is less than N, the system assigns the non-empty pillar a plurality of zero coordinate data points, such that the sum of a fourth count of the plurality of zero coordinates and the third count equals N (step 1716).

In some embodiments, the first threshold value P and the second threshold value N are predetermined values. In some embodiments, the first threshold value P and the second threshold value N are adaptive values. In particular, based on a density of the objects in the 3D space, the system can adjust P and/or N such that there are more pillars and/or more data points allowed in each pillar in a region of high object density, less pillars and/or less data points in each pillar in a region of low object density, and no pillars in a region of no objects.

Process 1700 continues when, for each non-empty pillar of the plurality of non-empty pillars, the system transforms each of the data points in the non-empty pillar into a respective modified data point (step 1718). The system generates a plurality of modified data points based upon the plurality of data points corresponding to each non-empty pillar. In particular, for each non-empty pillar, the system generates, for each data point in the non-empty pillar, a respective modified data point based on a relative distance between the data point and a center of the non-empty pillar. In an embodiment, the system generates, for each data point in the non-empty pillar, a respective modified data point based on the relative distance between the data point and the center of the non-empty pillar, and further based on a distance metric (e.g., a cylindrical Euclidean distance) from the sensor to the data point. The system then transforms the plurality of data points in each non-empty pillar to the plurality of modified data points generated for that non-empty pillar.

For example, in an embodiment, each data point of the plurality data points is represented by 3D spatial coordinates (x,y,z), a reflectance (r), and a time stamp (t). The system transforms each data point (x, y, z, r, t) to a respective modified data point ($x_{offset}$, $y_{offset}$, z, r, t, d), where $x_{offset}$ and $y_{offset}$ are measured based on a relative distance between each data point and the center of each non-empty point pillar, and d is the cylindrical Euclidean distance from the sensor to each data point. Each modified data point has D dimensions, where D is equal to the number of dimensions of the modified data point. In this example embodiment, each modified data point has D=6 dimensions: $x_{offset}$, $y_{offset}$, z, r, t, and d.

Process 1700 continues when the system generates a P dimensional pillar index vector (step 1720). The system first assigns a pillar index to each of the P non-empty pillars and a data point index to each of the modified data points in the P non-empty pillars. The system generates the P dimensional pillar index vector 1309 that maps the pillar index of each pillar to a corresponding location (e.g., a corresponding grid cell) in the original 2D grid from which the pillar vertically extends.

Process 1700 continues when the system generates a 3D stacked pillar tensor, which is a (D, P, N) dimensional tensor having a modified data point coordinate, a pillar index coordinate, and a data point index coordinate (step 1722). The 3D stacked pillar tensor maps, for each of the modified data points a pillar index of the pillar that includes the modified data point and a data point index of the modified data point to the modified data point ($x_{offset}$, $y_{offset}$, z, r, t, d). The system then generates a pillar output that includes the 3D stacked pillar tensor and the P dimensional pillar index vector (step 1724).

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A system comprising:
   one or more computer processors; and
   one or more non-transitory storage media storing instructions which, when executed by the one or more computer processors, cause performance of operations comprising:
      receiving a set of measurements from a sensor of a vehicle, the set of measurements comprising a plurality of data points that represent a plurality of objects in a three-dimensional (3D) space surrounding the vehicle, wherein each data point of the plurality of data points is represented by a set of 3D spatial coordinates;
      dividing the 3D space into a plurality of pillars, wherein each pillar of the plurality of pillars comprises a slice of the 3D space that extends from a respective portion of a two-dimensional (2D) plane of the 3D space;
      assigning each data point of the plurality of data points to a pillar in the plurality of pillars;
      for each data point in each pillar, modifying the 3D spatial coordinates to be relative to a center of the pillar;
      generating a pseudo-image based on the plurality of pillars;
      detecting the plurality of objects in the 3D space surrounding the sensor based on an analysis of the pseudo-image; and
      operating the vehicle based upon the detecting of the plurality of objects in the 3D space surrounding the vehicle.

2. The system of claim 1, further comprising:
   determining whether a first count of a plurality of non-empty pillars exceeds a first threshold value P;

in accordance with a determination that the first count of the plurality of non-empty pillars exceeds the first threshold value P, selecting P non-empty pillars from the plurality of non-empty pillars;

in accordance with a determination that the first count of the plurality of non-empty pillars is less than the first threshold value P:
  generating a second subset of pillars, wherein a sum of the first count and a second count of the second subset of pillars is equal to P;
  selecting P non-empty pillars from the plurality of non-empty pillars and the second subset of pillars;
  for each non-empty pillar of the P non-empty pillars:
    determining whether a third count of data points assigned to the each non-empty pillar exceeds a second threshold value N;
    in accordance with a determination that the third count of the data points assigned to the each non-empty pillar exceeds the second threshold value N, selecting N data points;
    in accordance with a determination that the third count of the data points in the each non-empty pillar is less than the second threshold value N, assigning the each non-empty pillar a plurality of zero coordinate data points, wherein the sum of a fourth count of the plurality of zero coordinates and the third count equals N.

3. The system of claim 2, wherein the first threshold value P is adaptive.

4. The system of claim 2, wherein the second threshold value N is adaptive.

5. The system of claim 1, wherein each of the data points is represented by the modified 3D spatial coordinates and a cylindrical Euclidean distance from the sensor to the data point.

6. The system of claim 5, wherein each of the data points is, is represented by the modified 3D spatial coordinates, the cylindrical Euclidean distance, a reflectance, and a time stamp.

7. The system of claim 1, wherein generating the pseudo-image comprises processing the plurality of pillars using a pillar processing module to generate the pseudo-image.

8. The system of claim 1, wherein detecting the one or more objects in the 3D space surrounding the sensor based on the analysis of the pseudo image comprises:
  processing the pseudo-image using a two-dimensional (2D) backbone neural network to generate an intermediate output that characterizes features of the pseudo-image; and
  processing the intermediate output using an object detection neural network to detect the one or more objects in the 3D space surrounding the sensor.

9. A method comprising:
  receiving a set of measurements from a sensor of a vehicle, the set of measurements comprising a plurality of data points that represent a plurality of objects in a three-dimensional (3D) space surrounding the vehicle, wherein each data point of the plurality of data points is represented by a set of 3D spatial coordinates;
  dividing the 3D space into a plurality of pillars, wherein each pillar of the plurality of pillars comprises a slice of the 3D space that extends from a respective portion of a two-dimensional (2D) plane of the 3D space;
  assigning each data point of the plurality of data points to a pillar in the plurality of pillars;
  for each data point in each pillar, modifying the 3D spatial coordinates to be relative to a center of the pillar;
  generating a pseudo-image based on the plurality of pillars;
  detecting the plurality of objects in the 3D space surrounding the sensor based on an analysis of the pseudo-image; and
  operating the vehicle based upon the detecting of the plurality of objects in the 3D space surrounding the vehicle,
  wherein the method is performed by one or more special-purpose computing devices.

10. The method of claim 9, further comprising:
  determining whether a first count of a plurality of non-empty pillars exceeds a first threshold value P;
  in accordance with a determination that the first count of the plurality of non-empty pillars exceeds the first threshold value P, selecting P non-empty pillars from the plurality of non-empty pillars;
  in accordance with a determination that the first count of the plurality of non-empty pillars is less than the first threshold value P:
    generating a second subset of pillars, wherein a sum of the first count and a second count of the second subset of pillars is equal to P;
    selecting P non-empty pillars from the plurality of non-empty pillars and the second subset of pillars;
  for each non-empty pillar of the P non-empty pillars:
    determining whether a third count of data points assigned to the each non-empty pillar exceeds a second threshold value N;
    in accordance with a determination that the third count of the data points assigned to the each non-empty pillar exceeds the second threshold value N, selecting N data points;
    in accordance with a determination that the third count of the data points in the each non-empty pillar is less than the second threshold value N, assigning the each non-empty pillar a plurality of zero coordinate data points, wherein the sum of a fourth count of the plurality of zero coordinates and the third count equals N.

11. The method of claim 9, wherein the first threshold value P is adaptive.

12. The method of claim 9, wherein each data point is represented by the modified 3D spatial coordinates a cylindrical Euclidean distance from the sensor to the data point.

13. The method of claim 12, wherein each of the data points is is represented by the modified 3D spatial coordinates, the cylindrical Euclidean distance, a reflectance, and a time stamp.

14. The method of claim 9, wherein generating the pseudo-image comprises processing the plurality of pillars using a pillar processing module to generate the pseudo-image.

15. The method of claim 9, wherein detecting the one or more objects in the 3D space surrounding the sensor based on the analysis of the pseudo image comprises:
  processing the pseudo-image using a two-dimensional (2D) backbone neural network to generate an intermediate output that characterizes features of the pseudo-image; and
  processing the intermediate output using an object detection neural network to detect the one or more objects in the 3D space surrounding the sensor.

16. One or more non-transitory storage media storing instructions which, when executed by one or more computing devices, cause performance of the method recited in claim 9.

* * * * *